US012701377B2

(12) United States Patent
Kaihoko et al.

(10) Patent No.: US 12,701,377 B2
(45) Date of Patent: Aug. 4, 2026

(54) ACOUSTIC PROCESSING DEVICE, ACOUSTIC PROCESSING METHOD, ACOUSTIC PROCESSING PROGRAM, AND ACOUSTIC PROCESSING SYSTEM

(71) Applicant: SONY GROUP CORPORATION, Tokyo (JP)

(72) Inventors: Toshiya Kaihoko, Tokyo (JP); Masashi Honda, Tokyo (JP); Tetsuo Ikeda, Tokyo (JP); Yoshikazu Ohura, Tokyo (JP); Yukiko Unno, Tokyo (JP); Yuki Andoh, Tokyo (JP)

(73) Assignee: Sony Group Corporation, Tokyo (JP)

( * ) Notice: Subject to any disclaimer, the term of this patent is extended or adjusted under 35 U.S.C. 154(b) by 243 days.

(21) Appl. No.: 18/292,517

(22) PCT Filed: Mar. 23, 2022

(86) PCT No.: PCT/JP2022/013689
§ 371 (c)(1),
(2) Date: Jan. 26, 2024

(87) PCT Pub. No.: WO2023/013154
PCT Pub. Date: Feb. 9, 2023

(65) Prior Publication Data

US 2025/0088817 A1 Mar. 13, 2025

(30) Foreign Application Priority Data

Aug. 6, 2021 (JP) ................................ 2021-129716

(51) Int. Cl.
*H04S 7/00* (2006.01)
*G01H 7/00* (2006.01)
(Continued)

(52) U.S. Cl.
CPC .......... *H04S 7/301* (2013.01); *H04S 2400/11* (2013.01); *H04S 2420/01* (2013.01)

(58) Field of Classification Search
None
See application file for complete search history.

(56) References Cited

U.S. PATENT DOCUMENTS 9,749,769 B2 8/2017 Giron
2007/0147636 A1 6/2007 Oteki
(Continued)

FOREIGN PATENT DOCUMENTS

JP 2007-068000 3/2007
JP 2007-142875 6/2007
(Continued)

OTHER PUBLICATIONS

English Translation of International Search Report prepared by the Japan Patent Office on Jun. 14, 2022, for International Application No. PCT/JP2022/013689, 2 pgs.

*Primary Examiner* — Qin Zhu
(74) *Attorney, Agent, or Firm* — SHERIDAN ROSS P.C.

(57) ABSTRACT

An acoustic processing device includes: an acquisition unit that acquires a recommended environment defined for each content, the recommended environment including an ideal arrangement of speakers in a space in which the content is reproduced; a measurement unit that measures a position of a listener located in the space, the number and arrangement of the speakers, and a space shape; and a correction unit that corrects audio that is observed at the position of the listener, the audio included in the content emitted from a speaker located in the space, to audio to be emitted from a virtual speaker ideally disposed in the recommended environment on the basis of information measured by the measurement unit.

20 Claims, 13 Drawing Sheets

(51) Int. Cl.
*G10K 15/08* (2006.01)
*H04R 3/00* (2006.01)

(56) References Cited

U.S. PATENT DOCUMENTS

| | | | | |
|---|---|---|---|---|
| 2015/0264502 | A1* | 9/2015 | Aoki | H04S 7/307<br>381/17 |
| 2015/0304791 | A1* | 10/2015 | Crockett | H04R 1/02<br>381/307 |
| 2019/0007782 | A1* | 1/2019 | Suenaga | H04R 5/04 |

FOREIGN PATENT DOCUMENTS

| | | | |
|---|---|---|---|
| JP | 2014103456 | A | 6/2014 |
| JP | 6550473 | B2 | 7/2019 |
| JP | 6737959 | | 8/2020 |
| WO | WO 2017/110882 | | 6/2017 |
| WO | WO 2021/002191 | | 1/2021 |

* cited by examiner

FIG.10

121

| SPEAKER ID | ACOUSTIC PROPERTIES | … |
|---|---|---|
| … | … | … |
| SP01 | A01 | … |
| SP02 | A02 | … |
| SP03 | A03 | … |
| SP04 | A04 | … |
| … | … | … |

FIG.11

122

| MEASUREMENT RESULT ID | USER POSITION INFORMATION | SPEAKER ARRANGEMENT INFORMATION | … |
|---|---|---|---|
| … | … | … | … |
| E01 | F01 | G01 | … |
| E02 | F02 | B02 | … |
| E03 | F03 | B03 | … |
| E04 | F04 | B04 | … |
| … | … | … | … |

ACOUSTIC PROCESSING DEVICE, ACOUSTIC PROCESSING METHOD, ACOUSTIC PROCESSING PROGRAM, AND ACOUSTIC PROCESSING SYSTEM

CROSS REFERENCE TO RELATED APPLICATIONS

This application is a national stage application under 35 U.S.C. 371 and claims the benefit of PCT Application No. PCT/JP2022/013689, having an international filing date of 23 Mar. 2022, which designated the United States, which PCT application claimed the benefit of Japanese Patent Application No. 2021-129716, filed 6 Aug. 2021, the entire disclosures of each of which are incorporated herein by reference.

FIELD

The present disclosure relates to an acoustic processing device, an acoustic processing method, an acoustic processing program, and an acoustic processing system that perform sound field processing during content reproduction.

BACKGROUND

In a movie or audio content, there are cases where so-called stereophonic sound (3D audio) is adopted which enhances realistic feeling at the time of content reproduction by emitting sound from the head, the back, or others of a listener.

In order to implement the stereophonic sound, it is ideal to arrange a plurality of speakers in such a manner as to surround the listener; however, it is practically difficult to install a large number of speakers in an ordinary home. As technology for solving this problem, there is known technology which implements stereophonic sound, in a pseudo manner even without ideally arranging speakers, by installing a microphone at a listening position and performing signal processing on the basis of collected sound (for example, Patent Literature 1). Meanwhile, there is known technology which causes sound to be recognized as that emitted from one pseudo virtual speaker by synthesizing waveforms output from a plurality of speakers (for example, Patent Literature 2).

CITATION LIST

Patent Literature

Patent Literature 1: Japanese Patent No. 6737959
Patent Literature 2: U.S. Pat. No. 9,749,769

SUMMARY

Technical Problem

However, in the stereophonic sound, in order to further enhance the realistic feeling of a listener, it is required to grasp the space shape such as the position of the listener, the environment around a reproduction device, and the distance to the ceiling or walls. That is, in order to implement the stereophonic sound, it is desirable to perform correction by comprehensively using information such as the position where the listener is located in the space, the number and the arrangement of speakers, and reflected sound from the walls or the ceiling.

Therefore, the present disclosure proposes an acoustic processing device, an acoustic processing method, an acoustic processing program, and an acoustic processing system capable of allowing content to be perceived in a sound field with a more realistic feeling.

Solution to Problem

An acoustic processing device according to one aspect of the present disclosure includes: an acquisition unit that acquires a recommended environment defined for each content, the recommended environment including an ideal arrangement of speakers in a space in which the content is reproduced; a measurement unit that measures a position of a listener located in the space, a number and arrangement of the speakers, and a space shape; and a correction unit that corrects audio that is observed at the position of the listener, the audio included in the content emitted from a speaker located in the space, to audio to be emitted from a virtual speaker ideally disposed in the recommended environment on a basis of information measured by the measurement unit.

BRIEF DESCRIPTION OF DRAWINGS

FIG. 10 is a diagram illustrating an example of a speaker information storing unit of the embodiment.

FIG. 11 is a diagram illustrating an example of a measurement result storing unit of the embodiment.

DESCRIPTION OF EMBODIMENTS

Hereinafter, embodiments will be described in detail on the basis of the drawings. Note that in each of the following embodiments, the same parts are denoted by the same symbols, and redundant description will be omitted.

The present disclosure will be described in the following order of items.

1. Embodiments
1-1. Overview of Acoustic Processing According to Embodiment
1-2. Configuration of Acoustic Processing Device According to Embodiment
1-3. Configuration of Speaker According to Embodiment
1-4. Procedure of Processing According to Embodiment
1-5. Modification of Embodiment
2. Other Embodiments
3. Effects of Acoustic Processing Device According to Present Disclosure
4. Hardware Configuration

1. Embodiments

1-1. Overview of Acoustic Processing According to Embodiment

Figure 1:
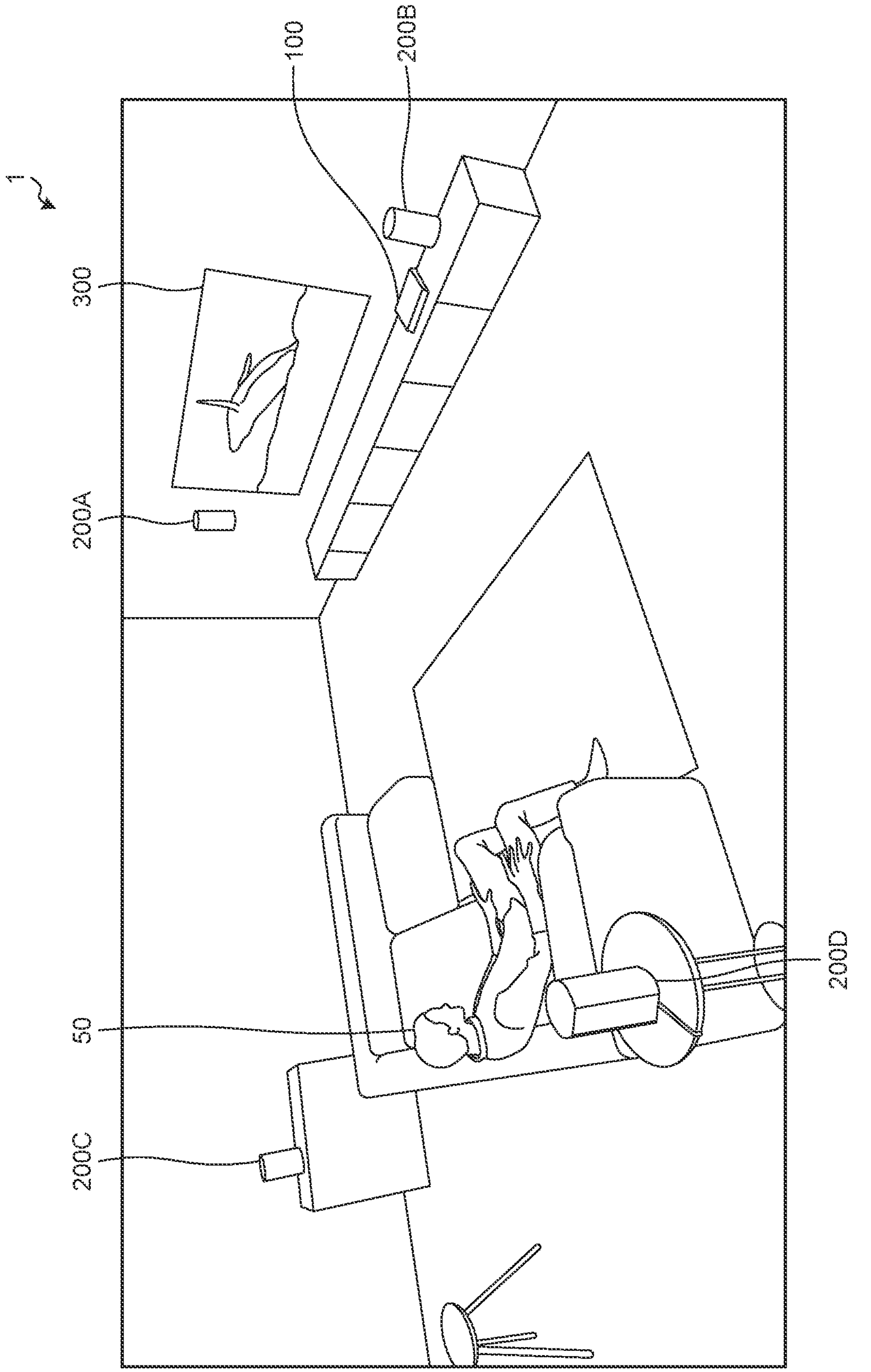
FIG. 1 is a diagram illustrating an overview of acoustic processing according to an embodiment.

An example of acoustic processing according to an embodiment of the present disclosure will be described with reference to FIG. 1. FIG. 1 is a diagram illustrating an overview of the acoustic processing of the embodiment. Specifically, FIG. 1 is a diagram illustrating components of an acoustic processing system 1 that executes acoustic processing according to the embodiment.

As illustrated in FIG. 1, the acoustic processing system 1 includes an acoustic processing device 100, a speaker 200A, a speaker 200B, a speaker 200C, and a speaker 200D. The acoustic processing system 1 outputs an audio signal to a user 50 who is a listener or corrects an audio signal to be output.

The acoustic processing device 100 is an example of an information processing device that executes the acoustic processing according to the present disclosure. Specifically, the acoustic processing device 100 controls audio signals output from the speaker 200A, the speaker 200B, the speaker 200C, and the speaker 200D. For example, the acoustic processing device 100 performs control to reproduce content such as a movie or music and to output audio included in the content from the speaker 200A and others. Note that, in a case where the content includes a video, the acoustic processing device 100 may perform control to output the video from a display 300. Furthermore, although details will be described later, the acoustic processing device 100 includes various sensors and the like for measuring positions of the user 50, the speaker 200A, and others.

The speaker 200A, the speaker 200B, the speaker 200C, and the speaker 200D are audio output devices that output audio signals. In the following description, in a case where it is not necessary to distinguish among the speaker 200A, the speaker 200B, the speaker 200C, and the speaker 200D, they are collectively referred to as the "speaker(s) 200". The speakers 200 are wirelessly connected to the acoustic processing device 100, receive an audio signal, and receive control related to measurement processing to be described later.

Note that each of the devices in FIG. 1 conceptually illustrates a function in the acoustic processing system 1 and can have various modes depending on an embodiment. For example, the acoustic processing device 100 may include two or more devices different for each function to be described later. Furthermore, the number of speakers 200 included in the acoustic processing system 1 is not necessarily four.

As described above, in the example illustrated in FIG. 1, the acoustic processing system 1 is a wireless audio speaker system implemented by a combination of the acoustic processing device 100 which is a control unit that performs audio signal processing and the speakers 200 wirelessly connected to the acoustic processing device 100. The acoustic processing system 1 provides the user 50 with so-called stereophonic sound (3D audio) that enhances the realistic feeling at the time of content reproduction by emitting sound from the head, the back, or the like of the listener.

Meanwhile, the content storing stereophonic sound includes audio signals presuming arrangement of not only so-called surround speakers in a planar direction but also so-called height speakers (hereinafter collectively referred to as "ceiling speakers") in a height direction. In order to appropriately reproduce such content, it is necessary to correctly arrange the flat speakers and the ceiling speakers around the position of the listener. The correct arrangement is, for example, a recommended arrangement of speaker positions defined in technical standards or the like of stereophonic sound. According to such standards, in order to implement stereophonic sound, it is desired to arrange a plurality of speakers in such a manner as to surround a listener; however, it is practically difficult to install a large number of speakers in an ordinary home.

Therefore, there is technology in which a microphone is installed at a listening position at the time of initial settings and signal processing is performed on the basis of sound collected thereat in order to reproduce a sound field similar to that of standards even if the arrangement is not in conformity with the standards. According to such technology, the sound field correction is performed so that the audio can be heard from the correct arrangement in conformity with the standards. Furthermore, according to such technology, in a case where ceiling speakers cannot be installed, the audio is corrected in such a manner that the listener feels the sound of ceiling speakers in a pseudo manner using a method of reflecting the sound on the ceiling to substitute for ceiling speakers or using signal processing technology (referred to as a virtualizer or others). However, in order to perform correction more correctly, it is desirable to measure the positions of the listener or the speakers regularly, to grasp the shape and characteristics of the room, and to perform correction by comprehensively using these pieces of information including a case where the space of the room is limited.

In this regard, the acoustic processing system 1 according to the embodiment acquires the recommended environment defined for each content including the ideal arrangement of speakers in the space in which the content is reproduced and measures the position of the listener located in the space, the number and the arrangement of the speakers, and the space shape. Furthermore, the acoustic processing system 1 corrects, on the basis of the measured information, the audio of content observed at the position of the listener and emitted from the speakers located in the space to audio to be emitted from virtual speakers ideally arranged in a recommended environment.

As described above, the acoustic processing system 1 measures the position of the listener in the real space, the arrangement of the speakers, and others and corrects the real audio in such a manner as to be closer to the audio emitted from the provisional speakers installed in the recommended environment on the basis of such information. With such a configuration, the user 50 can experience stereophonic sound with realistic feeling without arranging a large number of speakers as defined in the recommended environment. Furthermore, according to such a method, the user 50 can implement stereophonic sound without a burden of requiring time and effort such as installing a microphone at the listening position and performing initial settings.

The configuration and the overview of the acoustic processing system 1 have been described above with reference to FIG. 1. Next, acoustic processing according to the present disclosure will be specifically described with reference to FIG. 2 and subsequent drawings.

Figure 2:
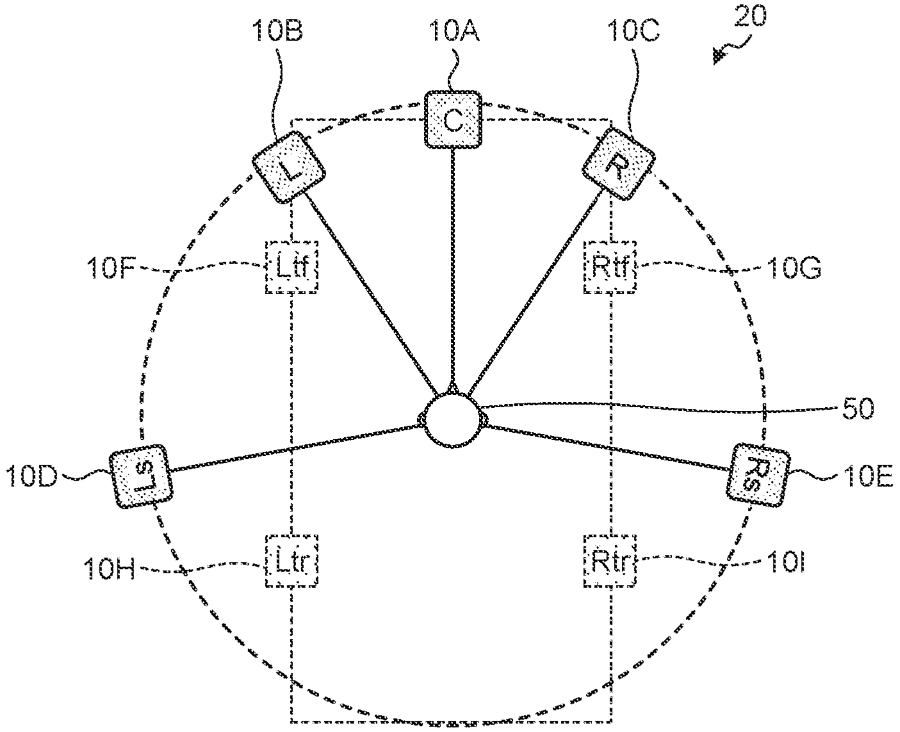
FIG. 2 is a diagram (1) for explaining speaker arrangement under a recommended environment.

FIG. 2 is a diagram (1) for explaining speaker arrangement under a recommended environment. FIG. 2 illustrates an example of speaker arrangement recommended in a case of listening 3D audio content in which audio of stereophonic sound is recorded. Specifically, illustrated in FIG. 2 is a recommended environment defined by Dolby Atmos (registered trademark).

In the example of FIG. 2, with the user 50 in the center, a center speaker 10A is disposed straight ahead, a left front speaker 10B is disposed in the left front, a right front speaker 10C is disposed in the right front, a left surround speaker 10D is disposed in the left rear, and a right front speaker 10E is disposed in the right rear. In addition, over the head of the user 50, namely, as ceiling speakers, a left top front speaker 10F is disposed in the upper left front, a right top front speaker 10G is disposed in the upper right front, a left top rear speaker 10H is disposed in the upper left rear, and a right top rear speaker 10I is disposed in the upper right rear. Although not illustrated in FIG. 2, in the recommended environment, a subwoofer for low-pitched sounds may also be added. In the arrangement of the example of FIG. 2, since there are five speakers in the horizontal direction, a subwoofer, and four speakers on the ceiling, it is also referred to as an "5.1.4" channel environment. In addition, the recommended environment may be a "7.1.4" or "5.1.2" environment, for example.

The acoustic processing device 100 acquires information such as the number and the arrangement of the speakers or the distance from the user 50 (listening position) from the speakers as illustrated in FIG. 2 as information regarding the recommended environment in content reproduction. For example, the acoustic processing device 100 may acquire the recommended environment from metadata included in the content at the time of content reproduction, or the recommended environment may be installed in advance by an administrator of the acoustic processing device 100 or the user 50. Note that, hereinafter, in a case where it is not necessary to distinguish among the speakers implementing the ideal arrangement in the recommended environment as illustrated in FIG. 2, the speakers are collectively referred to as "provisional speakers 10".

As illustrated in FIG. 2, in the recommended environment, the number of flat speakers (speakers installed at substantially the same height as that of the user 50) and the ceiling speakers to be installed, the distance and the angle from the user 50, the angle and the distance among the provisional speakers 10, or others are defined.

Figure 3:
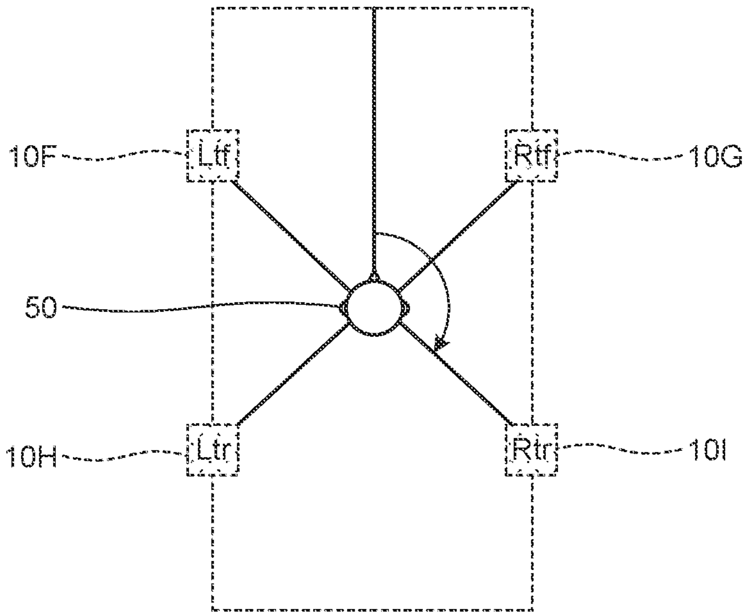
FIG. 3 is a diagram (2) for explaining the speaker arrangement under the recommended environment.

Next, a planar arrangement of the provisional speakers 10 regarding the ceiling speakers will be described with reference to FIG. 3. FIG. 3 is a diagram (2) for explaining the speaker arrangement in the recommended environment.

For example, as illustrated in FIG. 3, in the recommended environment, it is defined that the left top front speaker 10F and the right top front speaker 10G are installed at an angle of about 45 degrees from the right in front of the user 50. In addition, it is defined that the left top rear speaker 10H and the right top rear speaker 10I are each installed at an angle of about 135 degrees from the right in front of the user 50.

Figure 4:
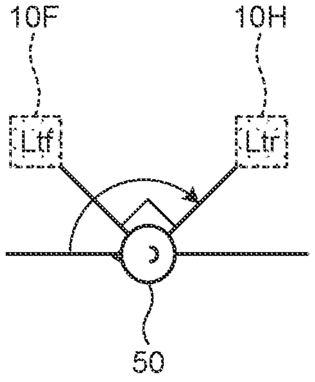
FIG. 4 is a diagram (3) for explaining the speaker arrangement under the recommended environment.

Next, the installation height of the provisional speakers 10 regarding the ceiling speaker will be described with reference to FIG. 4. FIG. 4 is a diagram (3) for explaining the speaker arrangement in the recommended environment. FIG. 4 illustrates a cross-sectional view corresponding to the arrangement illustrated in FIG. 3.

For example, as illustrated in FIG. 4, in the recommended environment, it is defined that the left top front speaker 10F (the same applies to the right top front speaker 10G (not illustrated) as well) be installed obliquely upward at an angle of about 45 degrees from the right in front of the user 50. It is also defined that the left top rear speaker 10H (the same applies to the right top rear speaker 10I (not illustrated) as well) be installed obliquely rearward at an angle of about 135 degrees from the right in front of the user 50. Furthermore, with the user 50 set as a center point, it is recommended that the left top front speaker 10F and the left top rear speaker 10H be installed at an angle of about 90 degrees apart. Note that the recommended environment illustrated in FIGS. 2 to 4 is one example, and there are various different recommended environments for each content depending on the number and the arrangement of speakers, the installation distance to the user 50, and others, for example, standards for stereophonic sound, specifications of a content production company, and so on.

As described above, the acoustic processing device 100 according to the embodiment corrects the audio output from the speakers 200 that are actually installed as if the provisional speakers 10 are placed in conformity with the recommended environment in a reproduction environment different that is from the recommended environment. First, prior to correction processing, the acoustic processing device 100 acquires the recommended environment indicating the arrangement and others of the provisional speakers 10 illustrated in FIGS. 2 to 4. Then, the acoustic processing device 100 corrects the audio output from the speakers 200 installed in the actual space on the basis of the recommended environment. Such processing will be described with reference to FIG. 5 and subsequent drawings.

Figure 5:
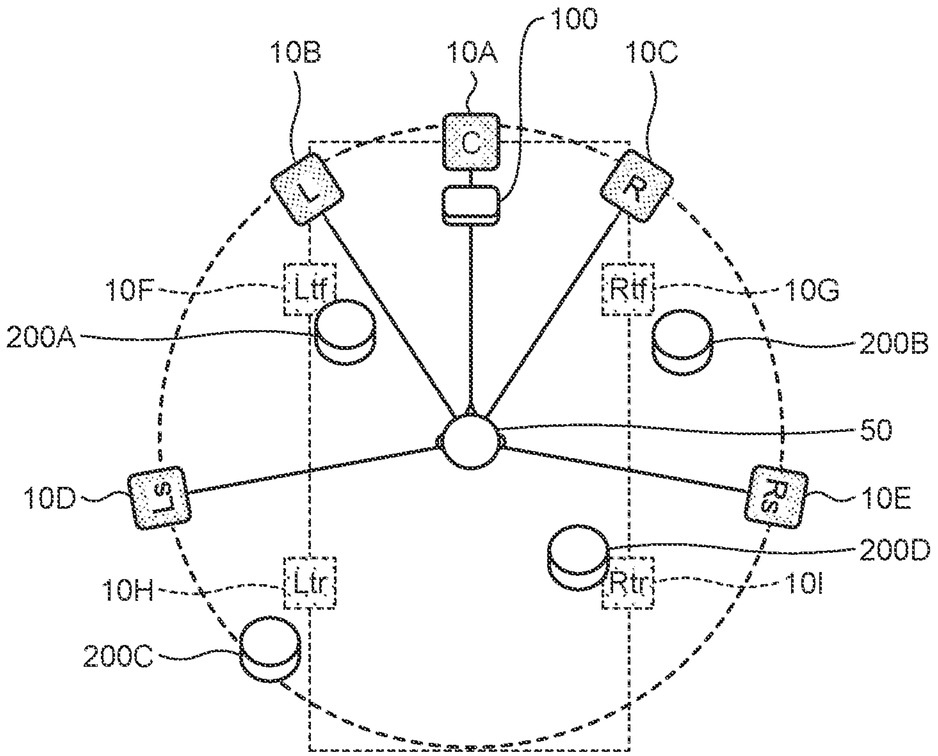
FIG. 5 is a diagram (1) for explaining the acoustic processing according to the embodiment.

FIG. 5 is a diagram (1) for explaining the acoustic processing according to the embodiment. As illustrated in FIG. 5, it is based on a premise that the speaker 200A, the speaker 200B, the speaker 200C, and the speaker 200D are installed in an arrangement different from the recommended environment in the space where the user 50 is located.

Since the number and the arrangement of the provisional speakers 10, the distance from each of the provisional speakers 10 to the user 50, and others are defined in the recommended environment, it is necessary to grasp the arrangement of the speakers 200, the location of the user 50, and others in order to perform the correction processing. Therefore, the acoustic processing device 100 measures the arrangement of the speakers 200, the location of the user 50, and others.

As an example, the acoustic processing device 100 measures the position of each of the speakers 200 using a wireless transmission and reception function (specifically, a wireless module and an antenna) included in the speaker 200. Although details will be described later, the acoustic processing device 100 can adopt a method (angle of arrival (AoA)) of receiving signals transmitted from the speakers 200 by a plurality of antennas and estimating a direction of a transmission side (speaker 200) by detecting a phase difference of the signals. Alternatively, the acoustic processing device 100 may use a method (angle of departure (AoD) of transmitting a signal while switching among a plurality of antennas included in the acoustic processing device 100 and estimating an angle (that is, the arrangement as viewed from the acoustic processing device 100) from a phase difference received by each of the speakers 200.

Furthermore, in a case where the position of the user 50 is measured, the acoustic processing device 100 may use a wireless communication device such as a smartphone held by the user 50. For example, the acoustic processing device 100 may cause the smartphone to transmit audio via a dedicated application or others, receive the audio by the acoustic processing device 100 and the speakers 200, and measure the position of the user 50 on the basis of the arrival time. Alternatively, the acoustic processing device 100 may measure the position of the smartphone by a method such as the AoA described above and estimate the measured position of the smartphone as the location of the user 50. Note that the acoustic processing device 100 may detect a smartphone located in the space using radio waves such as Bluetooth or may receive registration of a smartphone or the like to be in use from the user 50 in advance.

Alternatively, the acoustic processing device 100 may measure the positions of the user 50 or each of the speakers 200 by using a depth sensor such as a time of flight (ToF) sensor, an image sensor including an AI chip that has completed preliminary learning for recognizing a human face, or the like.

Figure 6:
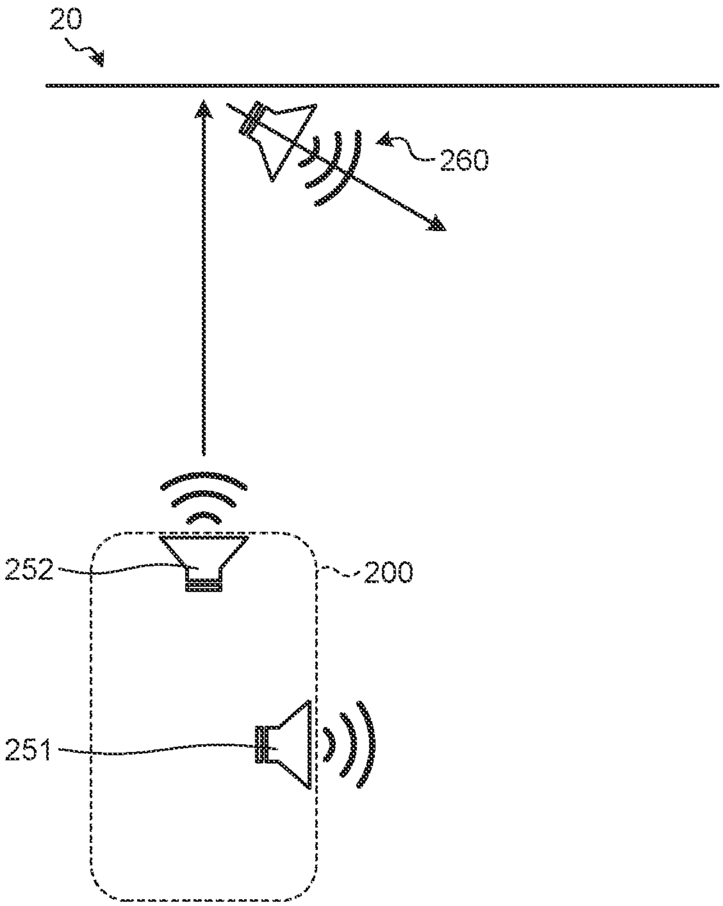
FIG. 6 is a diagram (2) for explaining the acoustic processing of the embodiment.

Subsequently, the acoustic processing device 100 measures the space shape. For example, the acoustic processing device 100 measures the space shape by causing the speakers 200 to transmit a measurement signal. This point will be described by referring to FIG. 6. FIG. 6 is a diagram (2) for explaining the acoustic processing according to the embodiment.

As illustrated in FIG. 6, a speaker 200 includes a ceiling facing unit 252 that outputs sound toward the ceiling in addition to a horizontal unit 251 that outputs sound in a horizontal direction to the user 50. That is, the speaker 200 of the embodiment is capable of emitting separate sounds in two directions. The speaker 200 can cause the user 50 to feel as if the sound is emitted from a virtual speaker 260 as a substitute for a ceiling speaker by reflecting the sound emitted from the ceiling facing unit 252 by a ceiling 20.

The speaker 200 can also measure the space shape using a measurement signal output from the ceiling facing unit 252. Such a method is referred to as the frequency modulated continuous wave (FMCW) or others. In such a method, sound, whose frequency linearly changes with time, is output from the speaker 200, a reflected wave is detected by a microphone included in the speaker 200, and the distance to the ceiling is obtained from the frequency difference (beat frequency).

Specifically, in a case where measurement of the space shape is requested from the acoustic processing device 100, the speaker 200 transmits a measurement signal toward the ceiling 20. Then, the speaker 200 measures the distance to the ceiling by observing the reflected sound of the measurement signal by the microphone included therein. Since the acoustic processing device 100 grasps the number and the arrangement of the speakers 200, it is possible to acquire the information related to the space shape in which the speakers 200 are installed by acquiring ceiling height information transmitted from the speakers 200.

Note that the acoustic processing device 100 may acquire map information of the space in which the user 50 is located using technology such as simultaneous localization and mapping (SLAM) using a depth sensor or an image sensor and estimate the space shape from such information.

Furthermore, the space shape may include information indicating the characteristics of the space. For example, the sound pressure or the sound quality of the reflected sound may vary depending on the material of the walls or the ceiling in the space. For example, the acoustic processing device 100 may manually receive input of information regarding the material of the room by the user 50 or may estimate the material of the room by irradiating the space with a measurement signal.

Figure 7:
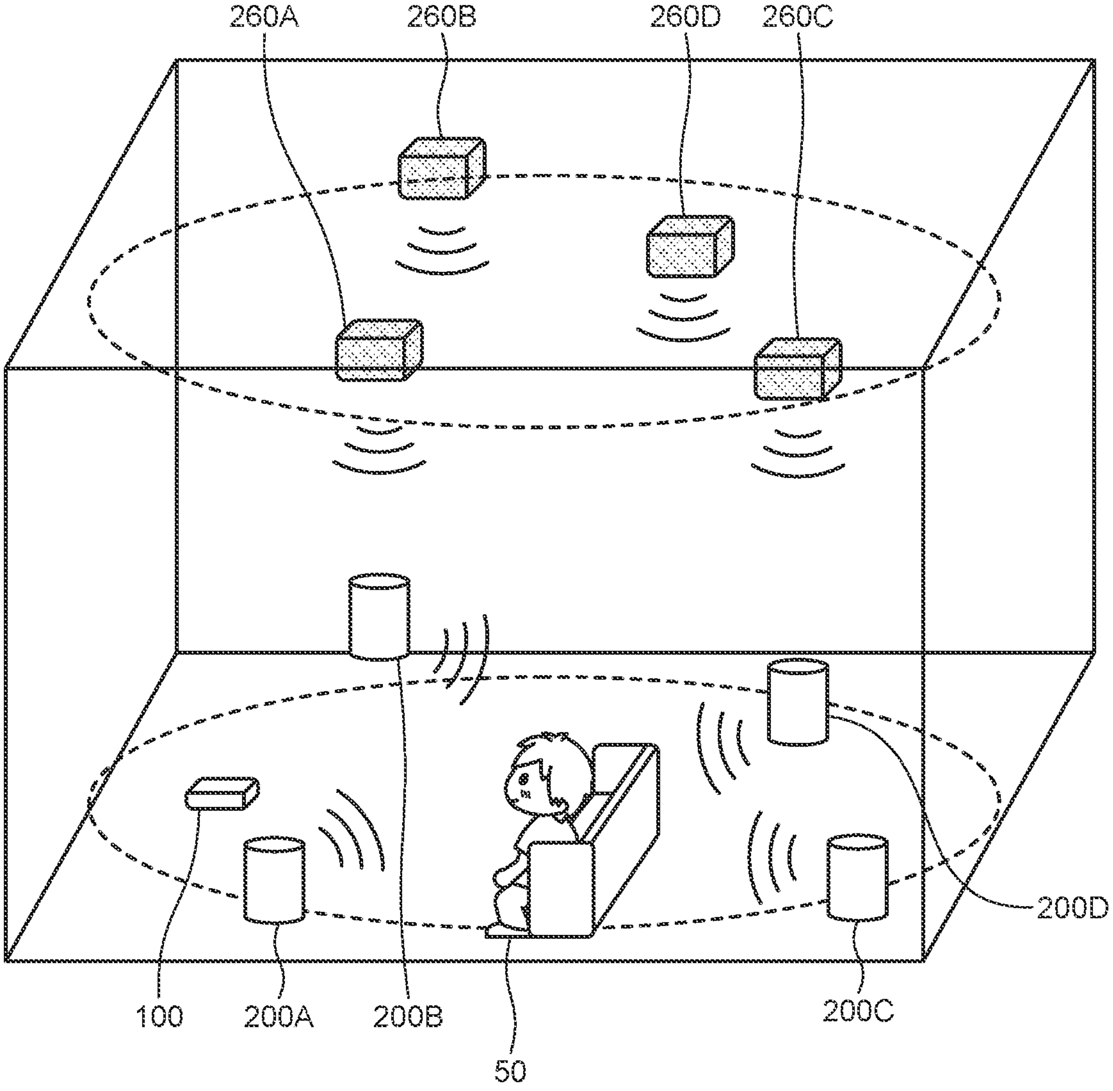
FIG. 7 is a diagram (3) for explaining the acoustic processing of the embodiment.

As described above, the acoustic processing device 100 can obtain the number and the arrangement of the speakers 200 located in the space, the location of the user 50, the space shape, and others through the measurement processing. The acoustic processing device 100 performs the correction processing of the sound field on the basis of these pieces of information. This point will be described by referring to FIG. 7. FIG. 7 is a diagram (3) for explaining the acoustic processing according to the embodiment.

As described above, the recommended environment for reproducing 3D audio content is defined; however, in the embodiment, it is presumed that the user 50 can arrange only four speakers of the speakers 200A, 200B, 200C, and 200D. However, even in a case where the ideal arrangement as illustrated in the drawing cannot be implemented, if the user 50 can feel as if the sound is emitted with the recommended speaker arrangement by the audio signal correction processing, it can be said that it is possible to implement reproduction of 3D audio content with realistic feeling. The acoustic processing device 100 performs such acoustic processing using the four speakers 200 installed in a real space.

Figure 8:
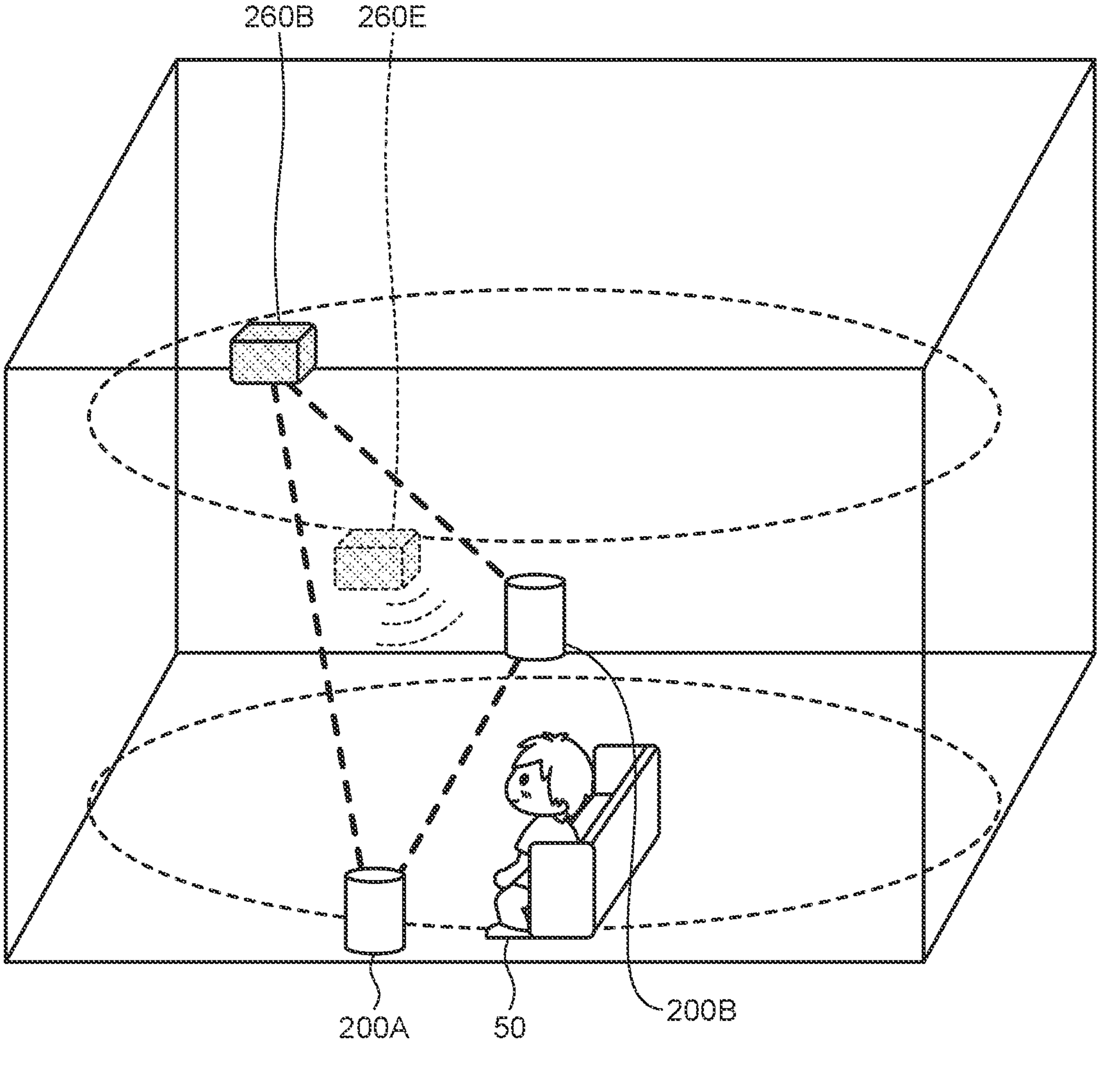
FIG. 8 is a diagram (4) for explaining the acoustic processing of the embodiment.

This point will be described by referring to FIG. 8. FIG. 8 is a diagram (4) for explaining the acoustic processing according to the embodiment.

The example of FIG. 8 illustrates a situation in which a new virtual speaker 260E is caused to appear using three sound sources of the speaker 200A, the speaker 200B, and a virtual speaker 260B using reflection from the ceiling. Specifically, the acoustic processing device 100 uses a speaker 200 that can be actually disposed or a reflection sound source, synthesizes the audio on the basis of their positional relationship, and generates a wavefront of a monopole sound source at the position of the virtual speaker 260E. Such wavefront synthesis can be implemented, for example, by the method described in Patent Literature 2 described above. Specifically, by using the method of "synthesis monopoles (monopole synthesis)" described in Patent Literature 2, the acoustic processing device 100 can form a synthetic sound field based on the recommended environment by combining the four speakers 200 and four reflection sound sources created by ceiling facing units 252 of the speakers 200.

As described above, as illustrated in FIGS. 1 to 8, the acoustic processing device 100 acquires a recommended environment defined for each content including the ideal arrangement of speakers in a space in which the content is reproduced. The acoustic processing device 100 also measures the position of the listener located in the space, the number and the arrangement of the speakers, and the space shape. Furthermore, the acoustic processing device 100 corrects, on the basis of the measured information, the audio of content observed at the position of the user 50 and emitted from the speakers 200 located in the space to audio to be emitted from the provisional speakers 10 ideally arranged in the recommended environment.

As a result, even in a speaker arrangement different from the recommended environment as illustrated in FIG. 7, the user 50 can feel as if listening to the sound output from the provisional speakers 10 arranged in the recommended environment illustrated in FIG. 2. That is, even in a speaker arrangement different from the recommended environment, the acoustic processing device 100 can cause the user to experience the 3D audio content with a similar realistic feeling to that in the recommended environment.

Furthermore, according to the acoustic processing according to the embodiment, the virtual speaker 260E can be formed on a farther side from the user 50 than the speakers 200 or the reflection sound sources that are actually installed are. For this reason, the acoustic processing device 100 can form the virtual speaker 260E at a position where installation is not possible due to the limitation of the size of the room, reproduce the audio within a distance recommended by the content such as a movie, or make the sound field space to appear larger.

1-2. Configuration of Acoustic Processing Device According to Embodiment

Figure 9:
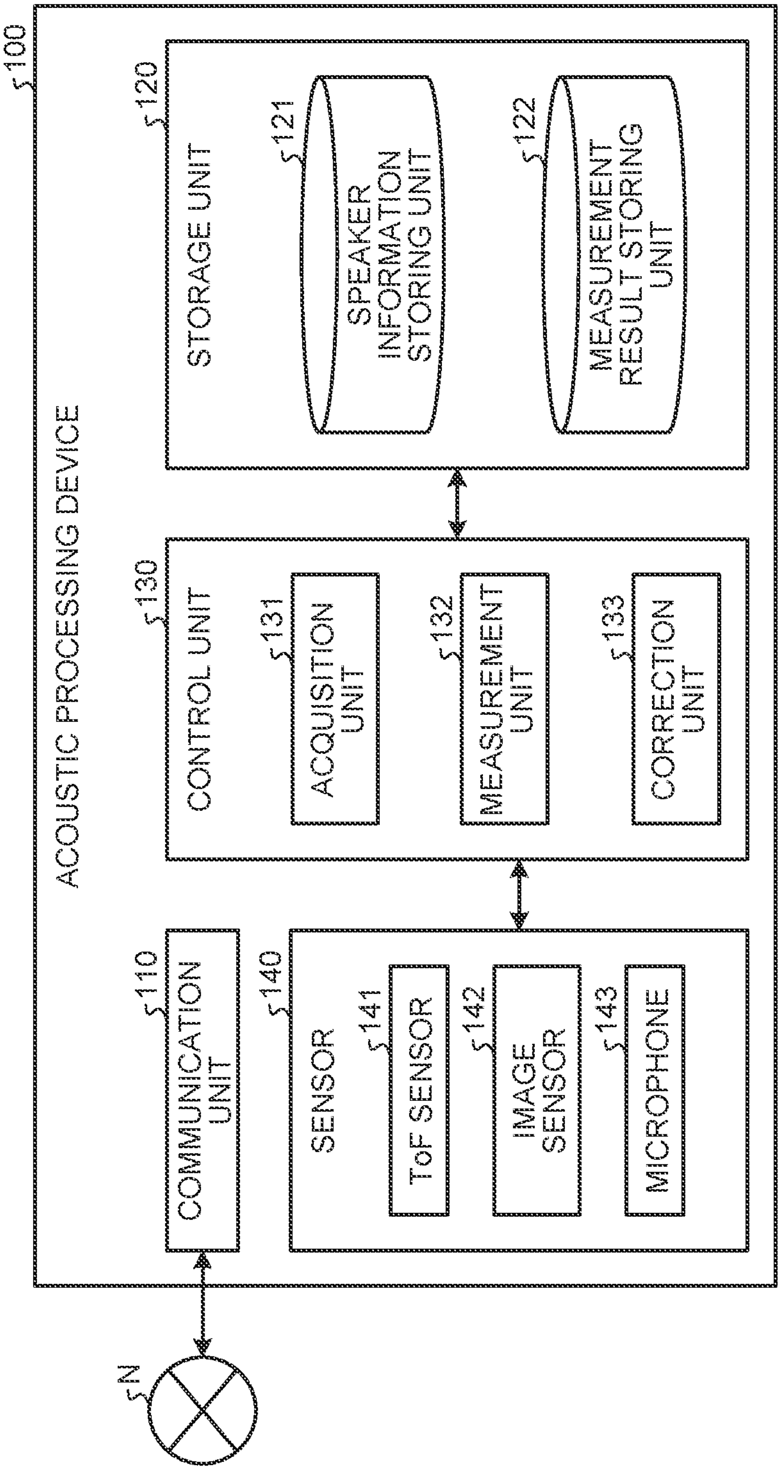
FIG. 9 is a diagram illustrating a configuration example of an acoustic processing device of the embodiment.

Next, a configuration of the acoustic processing device 100 will be described. FIG. 9 is a diagram illustrating a configuration example of the acoustic processing device 100 of the embodiment.

As illustrated in FIG. 9, the acoustic processing device 100 includes a communication unit 110, a storage unit 120, a control unit 130, and a sensor 140. Note that the acoustic processing device 100 may include an input unit (for example, a touch display, a button, or the like) that receives various operations from an administrator who manages the acoustic processing device 100, the user 50, or others and a display unit (for example, a liquid crystal display or the like) for displaying various types of information.

The communication unit 110 is implemented by, for example, a network interface card (NIC), a network interface controller, or the like. The communication unit 110 is connected to a network N in a wired or wireless manner and transmits and receives information to and from the speakers 200 and others via the network N. The network N is implemented by, for example, a wireless communication standard or scheme such as Bluetooth (registered trademark), the Internet, Wi-Fi (registered trademark), the ultra-wide band (UWB), or low-power wide area (LPWA).

The sensor 140 is a functional unit for detecting various types of information. The sensor 140 includes, for example, a ToF sensor 141, an image sensor 142, and a microphone 143.

The ToF sensor 141 is a depth sensor that measures a distance to an object located in a space.

The image sensor 142 is a pixel sensor that records a space captured by a camera or the like as pixel information (a still image or a moving image). Note that the image sensor 142 may include an AI chip learned in advance for image recognition of a human face, a speaker shape, and the like. In this case, the image sensor 142 can detect the user 50 and the speakers 200 by image recognition while capturing an image of the space with the camera.

The microphone 143 is a speech sensor that collects audio output from the speakers 200 or speech uttered by the user 50.

Furthermore, the sensor 140 may include a touch sensor that detects that the user touches the acoustic processing device 100 or a sensor that detects the current position of the acoustic processing device 100. For example, the sensor 140 may receive radio waves transmitted from global positioning system (GPS) satellites and detect position information (for example, the latitude and the longitude) indicating the current position of the acoustic processing device 100 on the basis of the received radio waves.

Furthermore, the sensor 140 may include a radio wave sensor that detects a radio wave emitted from the smartphone or the speakers 200, an electromagnetic wave sensor that detects an electromagnetic wave, or the like (antenna). The sensor 140 may further detect an environment in which the acoustic processing device 100 is placed. Specifically, the sensor 140 may include an illuminance sensor that detects illuminance around the acoustic processing device 100, a humidity sensor that detects humidity around the acoustic processing device 100, and others.

Furthermore, the sensor 140 is not necessarily included inside the acoustic processing device 100. For example, the sensor 140 may be installed outside the acoustic processing device 100 as long as it is possible to transmit information sensed using communication or the like to the acoustic processing device 100.

The storage unit 120 is implemented by, for example, a semiconductor memory element such as a random access memory (RAM) or a flash memory or a storage device such as a hard disk or an optical disk. The storage unit 120 includes a speaker information storing unit 121 and a measurement result storing unit 122. Hereinafter, each of the storing units will be sequentially described with reference to FIGS. 10 and 11.

FIG. 10 is a diagram illustrating an example of the speaker information storing unit 121 of the embodiment. As illustrated in FIG. 10, the speaker information storing unit 121 includes items such as "speaker ID" and "acoustic properties". Note that, in FIGS. 10 and 11, information stored in the storage unit 120 may be conceptually illustrated as "A01"; however, in practice, each piece of information described later is stored in the storage unit 120.

The "speaker ID" is identification information for identifying a speaker. The "acoustic properties" indicate acoustic properties for each speaker. For example, the acoustic properties may include information such as audio output value and frequency characteristics, the number and the direction of units, the efficiency of units, or the speed of response (time from input to output of an audio signal). The acoustic processing device 100 may obtain information related to the acoustic properties from a speaker manufacturer or the like via the network N or may obtain the acoustic properties by using a method of outputting a measurement signal from a speaker and performing measurement with a microphone included in the acoustic processing device 100.

Next, the measurement result storing unit 122 will be described. FIG. 11 is a diagram illustrating an example of the measurement result storing unit of the embodiment.

In the example illustrated in FIG. 11, the measurement result storing unit 122 includes items such as "measurement result ID", "user position information", and "speaker arrangement information". The "measurement result ID" indicates identification information for identifying a measurement result. The measurement result ID may include measurement date and time, position information indicating the location of the measured space, and others.

The "user position information" indicates the measured position of the user. The "speaker arrangement information" indicates the measured arrangement and the number of speakers. Note that the user position information and the speaker arrangement information may be stored in any format. For example, the user position information and the speaker arrangement information may be stored as objects arranged in a space on the basis of SLAM. Furthermore, the user position information and the speaker arrangement information may be stored as coordinate information, distance information, or the like centered on the position of the acoustic processing device 100. That is, the user position information and the speaker arrangement information may be in any format as long as the information allows the acoustic processing device 100 to specify the position of the user 50 or the speakers 200 in the space.

Returning to FIG. 9, the description will be continued. The control unit 130 is implemented by, for example, a central processing unit (CPU), a micro processing unit (MPU), a graphics processing unit (GPU), or the like executing a program (for example, an acoustic processing program according to the present disclosure) stored inside the acoustic processing device 100 using a random access memory (RAM) or the like as a work area. The control unit 130 is also a controller and may be implemented by, for example, an integrated circuit such as an application specific integrated circuit (ASIC) or a field programmable gate array (FPGA).

As illustrated in FIG. 9, the control unit 130 includes an acquisition unit 131, a measurement unit 132, and a correction unit 133.

The acquisition unit 131 acquires various types of information. For example, the acquisition unit 131 acquires a recommended environment defined for each content including an ideal arrangement of speakers in a space in which the content is reproduced.

In a case of acquiring content such as a movie or 3D audio via the network N, the acquisition unit 131 may acquire a recommended environment defined for the content from metadata included in the content. Furthermore, the acquisition unit 131 may acquire a recommended environment suitable for each content by receiving input from the user 50.

The measurement unit 132 measures the position of the user 50 located in the space, the number and the arrangement of the speakers 200, and the space shape.

For example, the measurement unit 132 measures the relative positions of the acoustic processing device 100 and the plurality of speakers 200 by using radio waves transmitted or received by the plurality of speakers located in the space, thereby measuring the number and the arrangement of the speakers located in the space.

Figure 12:
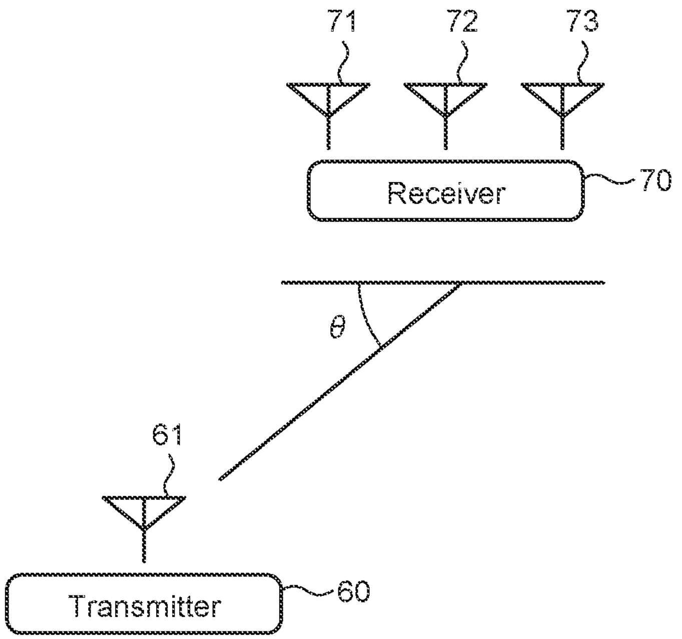
FIG. 12 is a diagram (1) for explaining measurement processing of the embodiment.

This point will be described with reference to FIGS. 12 and 13. FIG. 12 is a diagram (1) for explaining the measurement processing of the embodiment.

The example illustrated in FIG. 12 illustrates a situation in which a receiver 70 having a plurality of antennas receives a radio wave transmitted by a transmitter 60 of the radio wave. For example, the transmitter 60 is the acoustic processing device 100, and the receiver 70 is a speaker 200. The acoustic processing device 100 can estimate a relative angle θ of the reception side and the transmission side by transmitting a radio wave from an antenna 61 and detecting phase differences among signals received by a plurality of antennas 71, 72, and 73 included in the speaker 200. The acoustic processing device 100 measures the position of the speaker 200 on the basis of the angle θ that has been estimated. Such a method is referred to as AoA or others.

Next, another example will be described with reference to FIG. 13. FIG. 13 is a diagram (2) for explaining the measurement processing of the embodiment.

Figure 13:
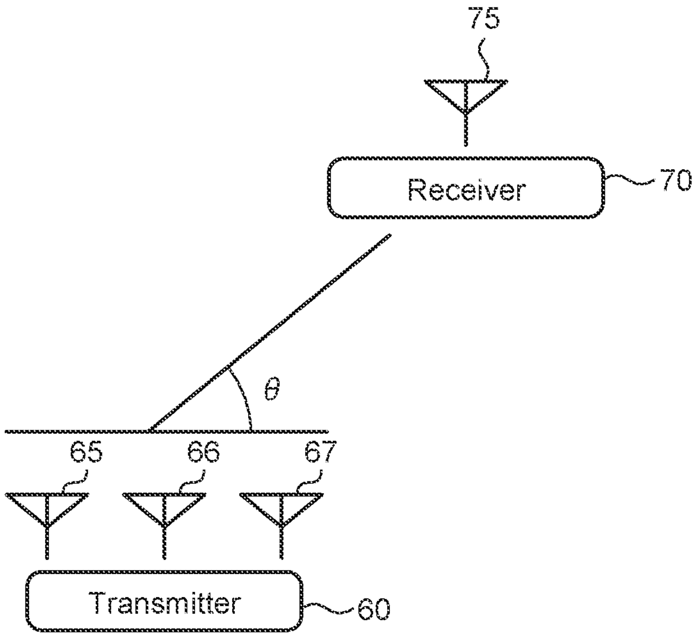
FIG. 13 is a diagram (2) for explaining the measurement processing of the embodiment.

The example illustrated in FIG. 13 illustrates a situation in which the receiver 70 receives a radio wave transmitted from a plurality of antennas by the transmitter 60 of the radio wave. For example, the transmitter 60 is the acoustic processing device 100, and the receiver 70 is a speaker 200. The acoustic processing device 100 transmits a signal while switching among a plurality of antennas of an antenna 65, an antenna 66, and an antenna 67 and estimates a relative angle θ between the reception side and the transmission side from phase differences when each of the speakers 200 receives a radio wave by an antenna 75. The acoustic processing device 100 measures the position of the speaker 200 on the basis of the angle θ that has been estimated. Such a method is referred to as AoD or others.

The processing illustrated in FIGS. 12 and 13 is an example of measurement, and the measurement unit 132 may use another approach. For example, the measurement unit 132 may measure at least one of the position of the user 50 located in the space, the number and the arrangement of the speakers 200, and the space shape using the ToF sensor 141 that detects an object located in the space.

Furthermore, the measurement unit 132 may measure the position of the user 50 or the speakers 200 located in the space by performing image recognition of the user 50 or the speakers 200 using the image sensor 142 included in the acoustic processing device 100.

Furthermore, the measurement unit 132 may measure the position of the user 50 or the speakers 200 located in the space by performing image recognition of the user 50 or the speakers 200 using an image sensor included in an external device. For example, the measurement unit 132 may use an image sensor included in the speakers 200 or the display 300, a USB camera connected to the display 300, or others. Specifically, the measurement unit 132 acquires an image captured by the speakers 200 or the display 300 and specifies and tracks the user 50 or the speakers 200 by image analysis, thereby measuring the positions of the user 50 and the speakers 200. Furthermore, the measurement unit 132 may measure acoustic properties or the like of the space on the basis of the shape of the space in which the user 50 is located, the material of the wall or the ceiling, or the like on the basis of such image recognition. Note that, in a case where image analysis is performed by the speakers 200, the display 300, or the like, the speakers 200 or the display 300 may convert the position, the space shape, or others of the user 50 obtained from the analysis into abstract data (metadata) and transmit the converted data to the acoustic processing device 100 via a video and audio connection cable such as HDMI (registered trademark) or a wireless system such as Wi-Fi.

Furthermore, the measurement unit 132 may measure the position of the user 50 located in the space by using a radio wave transmitted or received by a smartphone carried by the user 50. That is, the measurement unit 132 measures the position of the user 50 who uses the smartphone by estimating the position of the smartphone using the above-described AoA or AoD method. Note that, in a case where there is a plurality of listeners in the same space in addition to the user 50, the measurement unit 132 can perform measurement for all the listeners by sequentially performing measurement for all the listeners. Furthermore, the measurement unit 132 may measure the position of the user 50 or others by causing a device carried by the user 50 or each of the other listeners to output a measurement signal (an audible sound or an ultrasonic wave) and detecting the measurement signal with the microphone 143.

In addition, the measurement unit 132 measures, as the space shape of the space, the distance to the ceiling of the space on the basis of the reflected sound of the sound emitted from the ceiling facing unit 252 included in a speaker 200 located in the space. For example, as illustrated in FIG. 6, the measurement unit 132 controls the speaker 200 to output the measurement signal and measures the distance to the ceiling on the basis of the time elapses until the speaker 200 receives the measurement signal emitted by the speaker 200.

Furthermore, the measurement unit 132 may generate map information on the basis of an image captured by the image sensor 142 or an external device such as a smartphone or a speaker 200 and measure at least one of the position of the acoustic processing device 100 itself, the position of the user 50, the number and the arrangement of the speakers 200, or the space shape on the basis of the map information that has been generated. That is, the measurement unit 132 may create space shape data in which the speakers 200 are arranged by using the technology of SLAM and measure the arrangement of the user 50 or the speakers 200 located in the space.

Note that the measurement unit 132 may continuously measure the position of the user 50 located in the space, the number and the arrangement of speakers, and the space shape. For example, the measurement unit 132 continuously measures the position of the user 50 at timing when the content is stopped, timing at regular time intervals after the acoustic processing device 100 has been powered on, or other timing. In this case, the correction unit 133 corrects the audio of the content emitted from the speakers 200 located in the space using the information continuously measured by the measurement unit 132. As a result, for example, even in a case where the arrangement of the speakers 200 is changed by the user 50 who has cleaned the room, the measurement unit 132 can continuously measure and capture the change, and thus appropriate acoustic correction can be performed without the user 50 being conscious of it.

On the basis of the information measured by the measurement unit 132, the correction unit 133 corrects the audio observed at the position of the user 50, which is the audio of the content emitted from the speakers 200 located in the space, to audio emitted from the provisional speakers 10 ideally arranged in the recommended environment.

For example, as described with reference to FIGS. 7 and 8, the correction unit 133 corrects the audio of the speakers 200 to the audio emitted from the provisional speakers 10 using the method of synthesizing audio waveforms emitted from a plurality of speakers 200 to form a virtual speaker.

Furthermore, the correction unit 133 may receive input by the user 50 and reflect such information in the correction. For example, the correction unit 133 provides the information measured by the measurement unit 132 to the smartphone used by the user 50. Then, the correction unit 133 receives a change in the information on an application on the smartphone from the user 50 who has seen the information displayed on the application on the smartphone. For example, the correction unit 133 corrects the audio of the content on the basis of at least one of the position of the user 50 located in the space, the number and the arrangement of the speakers 200, and the space shape corrected on the smartphone by the user 50. As a result, since the correction unit 133 can perform correction on the basis of the position information finely adjusted by the user 50 who grasps the actual situation, it is possible to perform correction more accurately meeting the recommended environment.

Furthermore, the correction unit 133 may further correct the audio of the content that has been corrected by the correction unit 133 on the basis of the correction performed by the user 50. For example, after listening the audio of the content corrected by the correction unit 133, the user 50 may desire to modify an emphasized frequency or to adjust the arrival time (delay) of the audio output from the speakers 200. The correction unit 133 receives such information and corrects to audio meeting a request from the user 50. As a result, the correction unit 133 can form a sound field preferred by the user 50.

Furthermore, the correction unit 133 may correct the audio of the content on the basis of the behavior pattern of the user 50 or the arrangement pattern of the speakers 200 learned on the basis of the information measured by the measurement unit 132.

For example, the correction unit 133 acquires the position information of the user 50 or the position information of the speakers 200 continuously tracked by the measurement unit 132. Furthermore, the correction unit 133 acquires correction information of the sound field adjusted by the user 50. In addition, the correction unit 133 can provide an optimal sound field desired by the user 50 by learning these histories with artificial intelligence (AI).

Furthermore, the correction unit 133 may make various proposals to the user 50 through a smartphone application or the like by using both constantly monitoring the audio of the content to be reproduced with the microphone 143 and continuously performing learning processing using the AI. For example, the correction unit 133 may suggest the user 50 to slightly rotate the direction or to slightly change the installation position of a speaker 200 in such a manner as to bring the sound field closer to that estimated to be more preferred by the user 50. Furthermore, the correction unit 133 may predict the position where the user 50 is assumed to be located next on the basis of a history of tracking the position of the user 50 and perform sound field correction in accordance with the predicted position. As a result, immediately after the user 50 moves, the correction unit 133 can perform appropriate correction corresponding to the place after the movement.

Note that the acoustic processing performed by the control unit 130 is implemented by, for example, a manufacturer, who produces the acoustic processing device 100 or the speakers 200, implementing the acoustic processing; however, there may also be a form in which the acoustic processing is incorporated in a software module provided for content, and the software module is implemented on the acoustic processing device 100 or the speakers 200 for use.

1-3. Configuration of Speaker According to Embodiment

Figure 14:
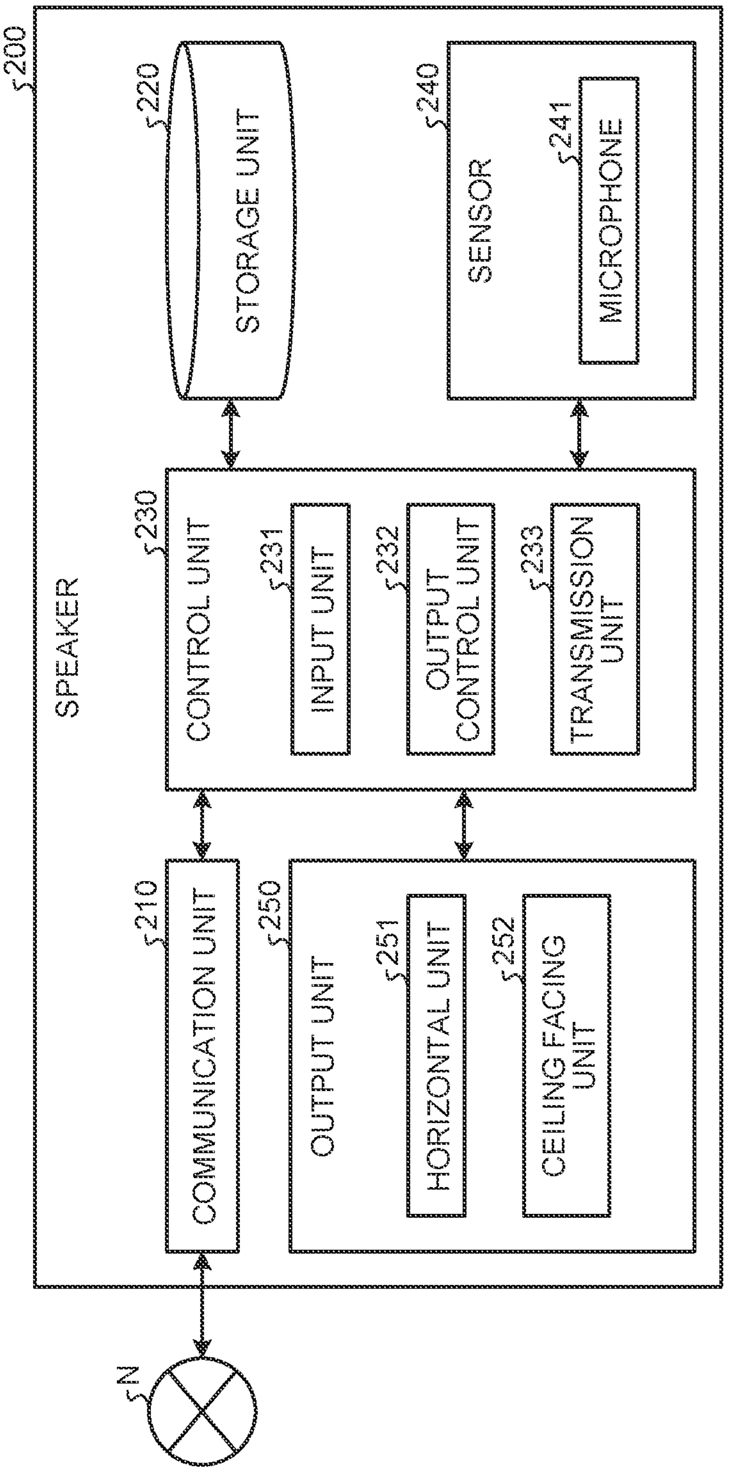
FIG. 14 is a diagram illustrating a configuration example of a speaker according to the embodiment.

Next, the configuration of a speaker 200 will be described. FIG. 14 is a diagram illustrating a configuration example of a speaker 200 according to the embodiment.

As illustrated in FIG. 14, the speaker 200 includes a communication unit 210, a storage unit 220, and a control unit 230.

The communication unit 210 is implemented by, for example, an NIC, a network interface controller, or the like. The communication unit 210 is connected with the network N (the Internet or others) in a wired or wireless manner and transmits and receives information to and from the acoustic processing device 100 and others via the network N.

The storage unit 220 is implemented by, for example, a semiconductor memory element such as a RAM or a flash memory or a storage device such as a hard disk or an optical disk. The storage unit 220 stores a measurement result, for example, in a case where the space shape is measured under the control of the acoustic processing device 100 or in a case where the position of the user 50 is measured.

The control unit 230 is implemented by, for example, a CPU, an MPU, a GPU, or the like executing a program stored inside the speaker 200 using a RAM or the like as a work area. Meanwhile, the control unit 230 is a controller and may be implemented by, for example, an integrated circuit such as an ASIC or an FPGA.

As illustrated in FIG. 14, the control unit 230 includes an input unit 231, an output control unit 232, and a transmission unit 233.

The input unit 231 receives input of an audio signal corrected by the acoustic processing device 100, a control signal by the acoustic processing device 100, and the like.

The output control unit 232 controls processing of outputting an audio signal or the like from an output unit 250. For example, the output control unit 232 controls the output unit 250 to output an audio signal corrected by the acoustic processing device 100. Furthermore, the output control unit 232 controls the output unit 250 to output a measurement signal in accordance with the control by the acoustic processing device 100.

The transmission unit 233 transmits various types of information. For example, in a case where the transmission unit 233 is controlled to execute measurement processing from the acoustic processing device 100, the transmission unit 233 transmits the measurement result to the acoustic processing device 100.

A sensor 240 is a functional unit for detecting various types of information. The sensor 240 includes, for example, a microphone 241.

The microphone 241 detects audio. For example, the microphone 241 detects reflected sound of the measurement signal output from the output unit 250.

Note that the speaker 200 may include various sensors other than those illustrated in FIG. 14. For example, the speaker 200 may include a ToF sensor or an image sensor for detecting the user 50 or another speaker 200.

The output unit 250 outputs an audio signal under the control of the output control unit 232. That is, the output unit 250 is a speaker unit that emits audio. The output unit 250 includes a horizontal unit 251 and a ceiling facing unit 252. Note that the speaker 200 may include more units in addition to the horizontal unit 251 and the ceiling facing unit 252.

1-4. Procedure of Processing According to Embodiment

Figure 15:
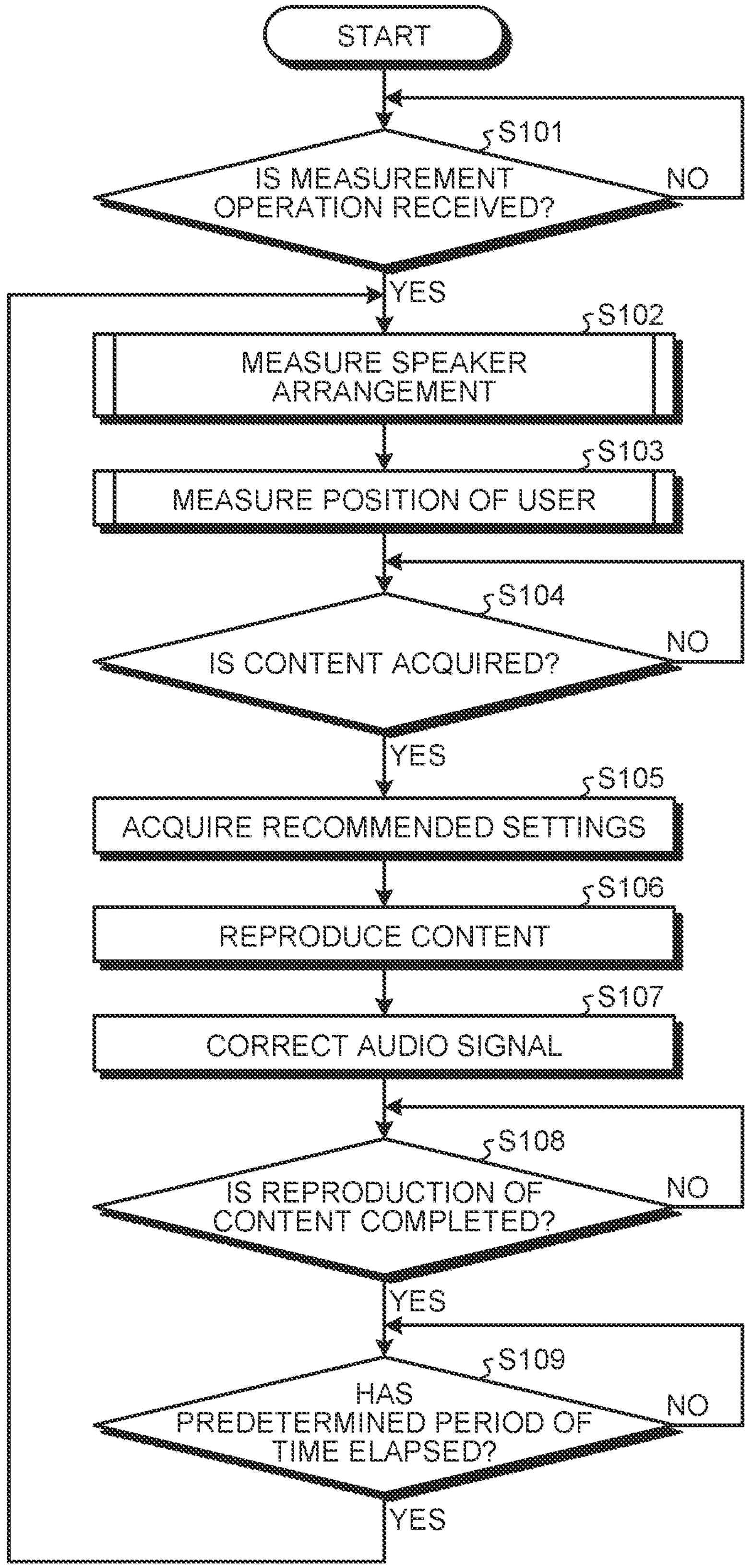
FIG. 15 is a flowchart (1) illustrating a flow of processing according to the embodiment.

Next, a procedure of processing according to the embodiment will be described by referring to FIGS. 15 to 17. An overall procedure of the acoustic processing according to the embodiment will be described first by referring to FIG. 15. FIG. 15 is a flowchart (1) illustrating a flow of processing of the embodiment.

As illustrated in FIG. 15, the acoustic processing device 100 determines whether or not a measurement operation has been received from the user 50, for example (Step S101). If no measurement operation has been received (Step S101; No), the acoustic processing device 100 waits until a measurement operation is received.

On the other hand, if a measurement operation has been received (Step S101; Yes), the acoustic processing device 100 measures the arrangement of the speakers 200 installed in the space (Step S102). Then, the acoustic processing device 100 measures the position of the user 50 (Step S103).

Subsequently, the acoustic processing device 100 determines whether or not content to be reproduced by the user 50 has been acquired (Step S104). If no content has been acquired, the acoustic processing device 100 waits until content is acquired (Step S104; No).

On the other hand, if content has been acquired (Step S104; Yes), the acoustic processing device 100 acquires the recommended environment corresponding to the content (Step S105). The acoustic processing device 100 starts reproduction of the content (Step S106).

At this point, the acoustic processing device 100 corrects an audio signal of the reproduced content as if being reproduced in the recommended environment of the content (Step S107).

Then, the acoustic processing device 100 determines whether or not reproduction of the content has been completed depending on the operation of the user 50, for example (Step S108). If reproduction of the content has not been completed (Step S108; No), the acoustic processing device 100 continues reproduction of the content.

On the other hand, if reproduction of the content has been completed (Step S108; Yes), the acoustic processing device 100 determines whether a predetermined period of time has elapsed (Step S109). If the predetermined period of time has not elapsed yet (Step S109; No), the acoustic processing device 100 stands by until the predetermined period of time elapses.

On the other hand, if the predetermined period of time has elapsed (Step S109; Yes), the acoustic processing device 100 again measures the arrangement of the speakers 200 (Step S102). That is, by tracking the positions of the speakers 200 or the user 50 every predetermined period of time set in advance, the acoustic processing device 100 can perform correction on the basis of appropriate position information even in a case where the content is reproduced subsequently.

Next, a procedure of the measurement processing related to a speaker 200 will be described with reference to FIG. 16. FIG. 16 is a flowchart (2) illustrating a flow of processing of the embodiment.

Figure 16:
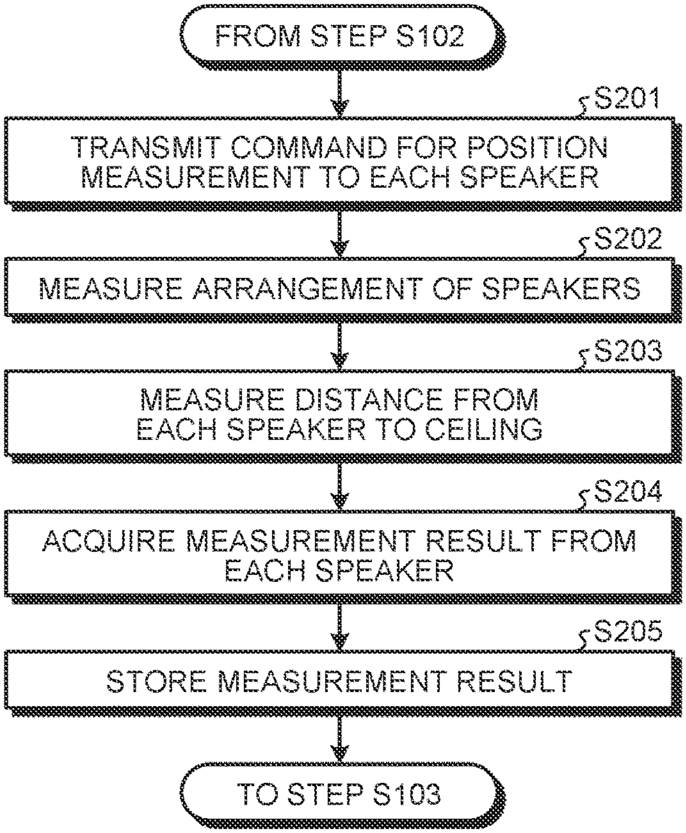
FIG. 16 is a flowchart (2) illustrating a flow of processing according to the embodiment.

As illustrated in FIG. 16, in a case where the positions or the number of speakers 200 is measured in Step S102, the acoustic processing device 100 transmits a command for position measurement to each of the speakers 200 (Step S201). The command is, for example, a control signal indicating that measurement is started.

The acoustic processing device 100 also measures the arrangement of the speakers 200 (Step S202). Such processing may be executed by the acoustic processing device 100 itself using the ToF sensor 141, or the speaker 200 or the smartphone held by the user 50 may be caused to execute such processing by using an image sensor included in the speaker 200, the smartphone, or the like.

Subsequently, the acoustic processing device 100 measures the distance from each of the speakers 200 to the ceiling (Step S203). The distance to the ceiling may be acquired by causing a speaker 200 to execute the measurement method of using reflection of a measurement signal emitted from the speaker 200, or the measurement method may be executed by the acoustic processing device 100 itself using the ToF sensor 141 or others.

Then, the acoustic processing device 100 acquires a measurement result from each of the speakers 200 (Step S204). Then, the acoustic processing device 100 stores the measurement result in the measurement result storing unit 122 (Step S205).

Next, a procedure of measurement processing related to the user 50 will be described with reference to FIG. 17. FIG. 17 is a flowchart (3) illustrating a flow of processing of the embodiment.

Figure 17:
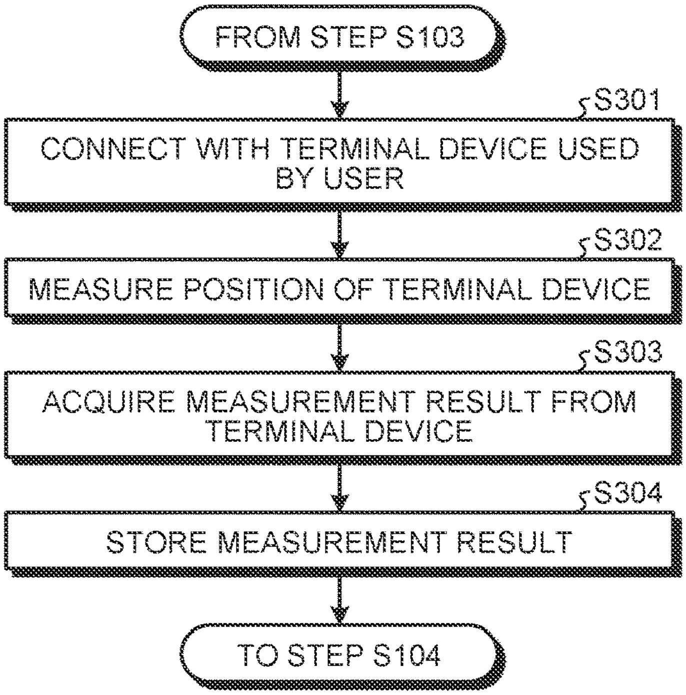
FIG. 17 is a flowchart (3) illustrating a flow of processing according to the embodiment.

As illustrated in FIG. 17, in a case where the position of the user 50 is measured in Step S103, the acoustic processing device 100 is connected to a terminal device (which may be a smartphone or a wearable device such as a smart watch or smart glasses worn by the user 50) used by the user 50 (Step S301).

Subsequently, the acoustic processing device 100 measures the position of the terminal device using any method described above (Step S302). Such processing may be executed by the terminal device using an image sensor included in the terminal device or may be executed by the acoustic processing device 100 itself using the ToF sensor 141 or others.

Then, the acoustic processing device 100 acquires the measurement result from the terminal device (Step S303). Then, the acoustic processing device 100 stores the measurement result in the measurement result storing unit 122 (Step S304).

1-5. Modification of Embodiment

In each of the above embodiments, the example has been described in which the acoustic processing system 1 includes the acoustic processing device 100 and the four speakers 200. However, the acoustic processing system 1 may have a configuration different from the above.

For example, the acoustic processing system 1 may have a configuration in which a plurality of speakers having different functions or acoustic properties is combined as long as the acoustic processing system 1 can be connected to the acoustic processing device 100 by communication. That is, the acoustic processing system 1 may include an existing speaker owned by the user 50, a speaker of another manufacturer different from that of the speakers 200, or others. In this case, the acoustic processing device 100 may emit an acoustic measurement signal or the like as described above to acquire acoustic properties of these speakers.

Furthermore, the speaker 200 does not necessarily have to include the horizontal unit 251 and the ceiling facing unit 252. In a case where the speaker 200 does not include the ceiling facing unit 252, the acoustic processing device 100 may measure the space shape such as the distance from the speaker 200 to the ceiling using the ToF sensor 141, the image sensor 142, or others instead of the speaker 200. Alternatively, instead of the acoustic processing device 100, the display 300 or others including a camera may measure the space shape such as the distance from the speaker 200 to the ceiling.

In addition, the acoustic processing system 1 may include a wearable neck speaker, headphones having an open structure that allows external sound to be heard, bone conduction headphones having a structure that does not block the cars, and others. In this case, the acoustic processing device 100 may measure a head-related transfer function (HRTF) of the user 50 as a characteristic to be incorporated in these output devices mounted on the user 50. In this case, the acoustic processing device 100 regards these output devices mounted on the user 50 as one speaker and combines waveforms with audio output from other speakers.

That is, the acoustic processing device 100 acquires the head-related transfer function of the user 50 and corrects the audio of a speaker disposed in the vicinity of the user 50 on the basis of the head-related transfer function of the user 50. As a result, the acoustic processing device 100 can generate a sound field by combining a speaker in the vicinity with clear sound field localization with another speaker disposed in the space, and thus it is possible to cause the user 50 to feel a more realistic feeling.

2. Other Embodiments

The processing according to the above embodiments may be performed in various different embodiments other than the above embodiments.

Among the processing described in the above embodiments, the whole or a part of the processing described as that performed automatically can be performed manually, or the whole or a part of the processing described as that performed manually can be performed automatically by a known method. In addition, a processing procedure, a specific name, and information including various types of data or parameters illustrated in the above or in the drawings can be modified as desired unless otherwise specified. For example, various types of information illustrated in the drawings are not limited to the information is illustrated.

In addition, each component of each device illustrated in the drawings is conceptual in terms of function and is not necessarily physically configured as illustrated in the drawings. That is, the specific form of distribution or integration of devices is not limited to those illustrated in the drawings, and the whole or a part thereof can be functionally or physically distributed or integrated in any unit depending on various loads, usage status, and others. For example, the measurement unit 132 and the correction unit 133 may be integrated.

In addition, the above embodiments and modifications can be combined as appropriate within a range where there is no conflict in the processing content.

Furthermore, the effects described herein are merely examples and are not limiting, and other effects may be achieved.

3. Effects of Acoustic Processing Device According to Present Disclosure

As described above, the acoustic processing device (the acoustic processing device 100 in the embodiment) according to the present disclosure includes the acquisition unit (the acquisition unit 131 in the embodiment), the measurement unit (the measurement unit 132 in the embodiment), and the correction unit (the correction unit 133 in the embodiment). The acquisition unit acquires a recommended environment defined for each content including an ideal arrangement of speakers in a space in which the content is reproduced. The measurement unit measures the position of a listener (the user 50 in the embodiment) located in the space, the number and the arrangement of the speakers (the speakers 200 in the embodiment), and the space shape. On the basis of the information measured by the measurement unit, the correction unit corrects the audio observed at the position of the listener, which is the audio of the content emitted from the speakers located in the space, to audio emitted from virtual speakers (the provisional speakers 10 in the embodiment) ideally arranged in a recommended environment.

As described above, the acoustic processing device according to the present disclosure can deliver the audio to the listener as if the speakers are arranged in the recommended environment by measuring the user position and others and then correcting the audio even in a case where the physical speakers are not arranged as in the recommended environment for listening 3D audio content and the like. As a result, the acoustic processing device is capable of allowing content to be perceived in a sound field with more realistic feeling.

The measurement unit measures the relative positions of the acoustic processing device and the plurality of speakers by using radio waves transmitted or received by the plurality of speakers located in the space, thereby measuring the number and the arrangement of the speakers located in the space.

As described above, the acoustic processing device can accurately measure the positions of the speakers at high speed by measuring the positions on the basis of the radio waves between the acoustic processing device and the speakers.

In addition, the measurement unit measures at least one of the position of the listener located in the space, the number and the arrangement of the speakers, or the space shape using the depth sensor that detects an object located in the space.

As described above, since the acoustic processing device can accurately grasp the distance to the speakers and the space shape by using the depth sensor, it is possible to perform accurate measurement and correction processing.

In addition, the measurement unit measures the position of the listener or the speakers located in the space by performing image recognition of the listener or the speakers using an image sensor included in the acoustic processing device or an external device (in the embodiment, the speakers 200, the display 300, a smartphone, or the like).

As described above, by performing measurement using a camera (image sensor) included in a television, the speakers, or others, the acoustic processing device can accurately measure the position or the like of the speakers even in a situation where measurement is difficult with other sensors or the like.

In addition, by using a radio wave transmitted or received by a terminal device (a smartphone, a wearable device, or the like in the embodiment) carried by the listener, the measurement unit measures the position of the listener located in the space.

As described above, by determining the position using the terminal device, the acoustic processing device can accurately measure the position of the listener even in a case where the listener cannot be captured by the image sensor or others.

In addition, the measurement unit measures, as the space shape of the space, the distance to the ceiling of the space on the basis of the reflected sound of the sound emitted from an audio emission unit (ceiling facing unit 252 in the embodiment) included in a speaker located in the space.

As described above, by measuring the space shape using the reflected sound output from the speaker, the acoustic processing device can quickly measure the space shape without going through complicated processing such as image recognition.

In addition, the measurement unit continuously measures the position of the listener located in the space, the number and the arrangement of the speakers, and the space shape. The correction unit corrects the audio of the content emitted from the speakers located in the space using the information continuously measured by the measurement unit.

As described above, by tracking the position of the listener or the speakers, the acoustic processing device can perform optimum correction in accordance with the state even in a case where a speaker is moved or the user moves for some reason, for example.

Furthermore, the acquisition unit acquires a recommended environment defined in the content from metadata included in the content.

As described above, by acquiring a recommended environment for each content, the acoustic processing device can perform correction processing meeting the recommended environment requested for each content.

Furthermore, the acquisition unit acquires the head-related transfer function of the listener. The correction unit corrects the audio of a speaker disposed in the vicinity of the listener on the basis of the head-related transfer function of the listener.

In this manner, the acoustic processing device can provide the listener with a sound field experience with more realistic feeling by performing correction in which open headphones and the like are incorporated as a part of the system.

Furthermore, the measurement unit generates map information on the basis of an image captured by an image sensor included in the acoustic processing device or an external device and measures at least one of the position of the acoustic processing device itself, the position of the listener, the number and the arrangement of the speakers, or the space shape on the basis of the map information that has been generated.

In this manner, the acoustic processing device can perform acoustic correction including obstacles such as positions of columns or walls in the space by performing measurement using the map information.

Furthermore, the correction unit provides the information measured by the measurement unit to the terminal device used by the listener and corrects the audio of the content on the basis of at least one of the position of the listener located in the space, the number and the arrangement of the speakers, or the space shape corrected on the terminal device by the listener.

As described above, the acoustic processing device can perform more accurate correction by providing the measured situation via an application or the like of the terminal device and accepting more detailed position correction or the like from the listener.

Furthermore, the correction unit further corrects the audio of the content, which has been corrected by the correction unit, on the basis of the correction performed by the listener.

In this manner, by receiving a request from the listener for the corrected sound, the acoustic processing device can correct the sound to that more favorable to the user, such as a frequency to be emphasized or a delay situation.

Furthermore, the correction unit corrects the audio of the content on the basis of the behavior pattern of the listener or the arrangement pattern of the speakers learned on the basis of the information measured by the measurement unit.

In this manner, by learning the situation in which the listener or the speakers are moved, the acoustic processing device can perform sound field correction in accordance with the situation of the place, such as optimizing the audio to a position where the listener is likely to be located or estimating the position of the speakers after being moved and correcting the audio.

4. Hardware Configuration

Figure 18:
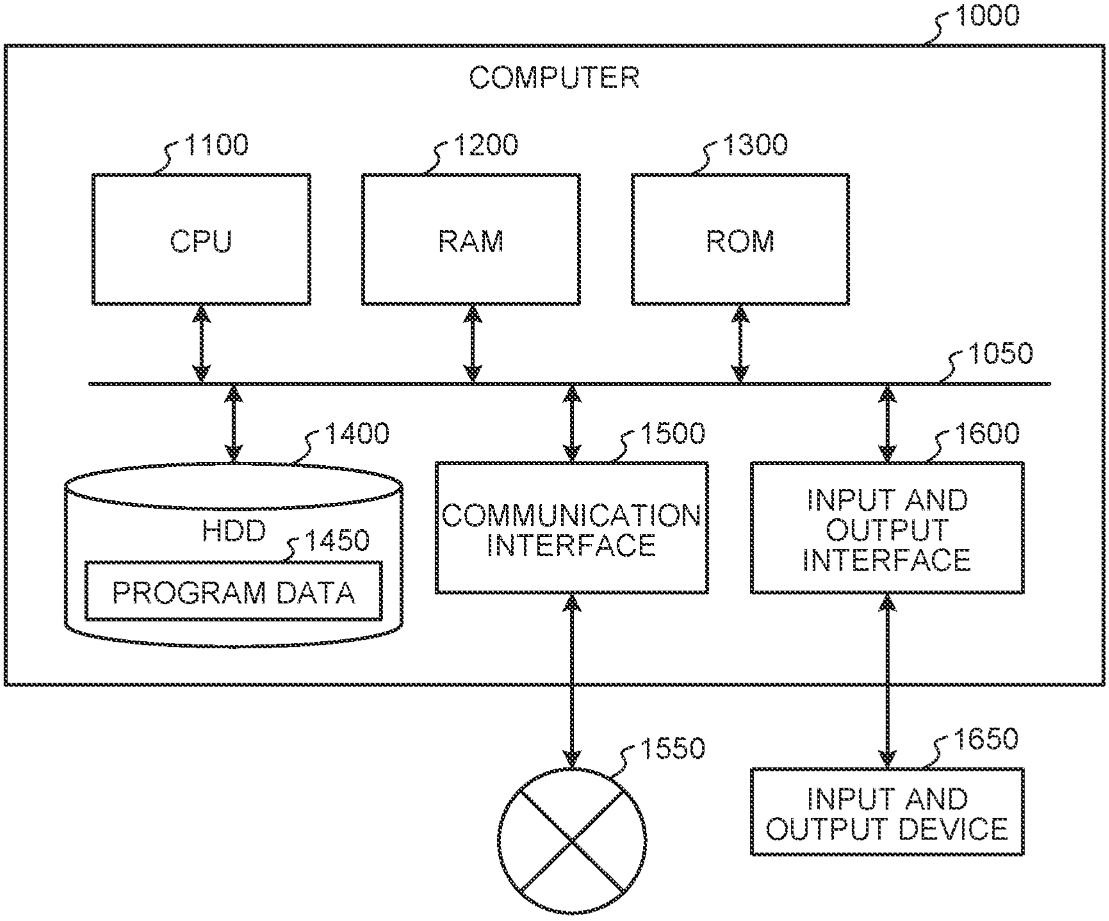
FIG. 18 is a hardware configuration diagram illustrating an example of a computer that implements the functions of the acoustic processing device.

An information device such as the acoustic processing devices 100 according to the embodiments described above is implemented by, for example, a computer 1000 having a configuration as illustrated in FIG. 18. Hereinafter, the acoustic processing device 100 according to the present disclosure will be described as an example. FIG. 18 is a hardware configuration diagram illustrating an example of the computer 1000 that implements the functions of the acoustic processing device 100. The computer 1000 includes a CPU 1100, a RAM 1200, a read only memory (ROM) 1300, a hard disk drive (HDD) 1400, a communication interface 1500, and an input and output interface 1600. The components of the computer 1000 are connected by a bus 1050.

The CPU 1100 operates in accordance with a program stored in the ROM 1300 or the HDD 1400 and controls each of the components. For example, the CPU 1100 loads a program stored in the ROM 1300 or the HDD 1400 in the RAM 1200 and executes processing corresponding to various programs.

The ROM 1300 stores a boot program such as a basic input output system (BIOS) executed by the CPU 1100 when the computer 1000 is activated, a program dependent on the hardware of the computer 1000, and the like.

The HDD 1400 is a computer-readable recording medium that non-transiently records a program to be executed by the CPU 1100, data used by such a program, and the like. Specifically, the HDD 1400 is a recording medium that records an acoustic processing program according to the present disclosure, which is an example of program data 1450.

The communication interface 1500 is an interface for the computer 1000 to be connected with an external network 1550 (for example, the Internet). For example, the CPU 1100 receives data from another device or transmits data generated by the CPU 1100 to another device via the communication interface 1500.

The input and output interface 1600 is an interface for connecting an input and output device 1650 and the computer 1000. For example, the CPU 1100 receives data from an input device such as a keyboard or a mouse via the input and output interface 1600. The CPU 1100 also transmits data to an output device such as a display, a speaker, or a printer via the input and output interface 1600. Furthermore, the input and output interface 1600 may function as a media interface that reads a program or the like recorded in a predetermined recording medium. A medium refers to, for example, an optical recording medium such as a digital versatile disc (DVD) or a phase change rewritable disk (PD), a magneto-optical recording medium such as a magneto-optical disk (MO), a tape medium, a magnetic recording medium, or a semiconductor memory.

For example, in a case where the computer 1000 functions as the acoustic processing device 100 according to the embodiment, the CPU 1100 of the computer 1000 implements the function of the control unit 130 or other units by executing the acoustic processing program loaded on the RAM 1200. The HDD 1400 also stores the acoustic processing program according to the present disclosure or data in the storage unit 120. Note that although the CPU 1100 reads the program data 1450 from the HDD 1400 and executes the program data 1450, as another example, these programs may be acquired from another device via the external network 1550.

Note that the present technology can also have the following configurations.

(1) An acoustic processing device comprising:

an acquisition unit that acquires a recommended environment defined for each content, the recommended environment including an ideal arrangement of speakers in a space in which the content is reproduced;

a measurement unit that measures a position of a listener located in the space, a number and arrangement of the speakers, and a space shape; and a correction unit that corrects audio that is observed at the position of the listener, the audio included in the content emitted from a speaker located in the space, to audio to be emitted from a virtual speaker ideally disposed in the recommended environment on a basis of information measured by the measurement unit.

(2) The acoustic processing device according to (1), wherein the measurement unit measures the number and the arrangement of the speakers located in the space by measuring relative positions of the acoustic processing device and a plurality of speakers using radio waves transmitted or received by the plurality of speakers located in the space.

(3) The acoustic processing device according to (1) or (2), wherein the measurement unit measures at least one of the position of the listener located in the space, the number and the arrangement of the speakers, or the space shape using a depth sensor that detects an object located in the space.

(4) The acoustic processing device according to any one of (1) to (3), wherein the measurement unit measures the position of the listener or the speakers located in the space by performing image recognition of the listener or the speakers using an image sensor comprised in the acoustic processing device or an external device.

(5) The acoustic processing device according to any one of (1) to (4), wherein the measurement unit measures the position of the listener located in the space by using a radio wave transmitted or received by a terminal device carried by the listener.

(6) The acoustic processing device according to any one of (1) to (5), wherein the measurement unit measures, as the space shape of the space, a distance to a ceiling of the space on a basis of reflected sound of sound emitted from an audio emission unit comprised in a speaker located in the space.

(7) The acoustic processing device according to any one of (1) to (6), wherein the measurement unit continuously measures the position of the listener located in the space, the number and the arrangement of the speakers, and the space shape, and the correction unit corrects the audio of the content emitted from the speaker located in the space by using information continuously measured by the measurement unit.

(8) The acoustic processing device according to any one of (1) to (7), wherein the acquisition unit acquires the recommended environment defined for the content from metadata included in the content.

(9) The acoustic processing device according to any one of (1) to (8), wherein the acquisition unit acquires a head-related transfer function of the listener, and the correction unit corrects audio of the speaker disposed in a vicinity of the listener on a basis of the head-related transfer function of the listener.

(10) The acoustic processing device according to any one of (1) to (9), wherein the measurement unit generates map information on a basis of an image captured by an image sensor comprised in the acoustic processing device or an external device and measures at least one of a position of the acoustic processing device itself, the position of the listener, the number and the arrangement of the speakers, or the space shape on a basis of the map information that has been generated.

(11) The acoustic processing device according to any one of (1) to (10), wherein the correction unit provides information measured by the measurement unit to a terminal device used by the listener and corrects the audio of the content on a basis of at least one of the position of the listener located in the space, the number and the arrangement of the speakers, or the space shape corrected on the terminal device by the listener.

(12) The acoustic processing device according to any one of (1) to (11), wherein the correction unit further corrects the audio of the content, the audio having been corrected by the correction unit, on a basis of correction performed by the listener.

(13) The acoustic processing device according to any one of (1) to (12), wherein the correction unit corrects the audio of the content on a basis of a behavior pattern of the listener or an arrangement pattern of the speakers learned on a basis of information measured by the measurement unit.

(14) An acoustic processing method comprising the steps of:

by a computer, acquiring a recommended environment defined for each content, the recommended environment including an ideal arrangement of speakers in a space in which the content is reproduced;

measuring a position of a listener located in the space, a number and arrangement of the speakers, and a space shape; and correcting audio that is observed at the position of the listener, the audio included in the content emitted from a speaker located in the space, to audio to be emitted from a virtual speaker ideally disposed in the recommended environment on a basis of the information that has been measured.

(15) An acoustic processing program for causing a computer to function as:

an acquisition unit that acquires a recommended environment defined for each content, the recommended environment including an ideal arrangement of speakers in a space in which the content is reproduced;

a measurement unit that measures a position of a listener located in the space, a number and arrangement of the speakers, and a space shape; and a correction unit that corrects audio that is observed at the position of the listener, the audio included in the content emitted from a speaker located in the space, to audio to be emitted from a virtual speaker ideally disposed in the recommended environment on a basis of information measured by the measurement unit.

(16) An acoustic processing system comprising an acoustic processing device and a speaker, wherein the acoustic processing device comprises:

an acquisition unit that acquires a recommended environment defined for each content, the recommended environment including an ideal arrangement of speakers in a space in which the content is reproduced;

a measurement unit that measures a position of a listener located in the space, a number and arrangement of the speakers, and a space shape; and a correction unit that corrects audio that is observed at the position of the listener, the audio included in the content emitted from a speaker located in the space, to audio to be emitted from a virtual speaker ideally disposed in the recommended environment on a basis of information measured by the measurement unit, the speaker comprises:

an audio emission unit that emits an audio signal toward a predetermined portion of the space; and an observation unit that observes reflected sound of the audio signal emitted by the audio emission unit, and the measurement unit measures the space shape on a basis of a time having elapsed from emission of the audio signal by the audio emission unit to observation of the reflected sound by the observation unit.

REFERENCE SIGNS LIST

1 ACOUSTIC PROCESSING SYSTEM
10 PROVISIONAL SPEAKER
50 USER
100 ACOUSTIC PROCESSING DEVICE
110 COMMUNICATION UNIT
120 STORAGE UNIT
121 SPEAKER INFORMATION STORING UNIT
122 MEASUREMENT RESULT STORING UNIT
130 CONTROL UNIT
131 ACQUISITION UNIT
132 MEASUREMENT UNIT
133 CORRECTION UNIT
140 SENSOR
200 SPEAKER

What is claimed is:

1. An acoustic processing device, comprising:

an acquisition unit, wherein the acquisition unit includes an acquisition unit software module that acquires a recommended environment defined for each content, the recommended environment including an ideal arrangement of speakers in a space in which the content is reproduced;

a measurement unit, wherein the measurement unit includes a measurement unit software module that measures a position of a listener located in the space, a number and arrangement of the speakers, and a space shape; and a correction unit, wherein the correction unit includes a correction unit software module that corrects audio that is observed at the position of the listener, the audio included in the content emitted from a speaker located in the space, to audio to be emitted from a virtual speaker ideally disposed in the recommended environment on a basis of information measured by the measurement unit.

2. The acoustic processing device according to claim 1, wherein the measurement unit measures the number and the arrangement of the speakers located in the space by measuring relative positions of the acoustic processing device and a plurality of speakers using radio waves transmitted or received by the plurality of speakers located in the space.

3. The acoustic processing device according to claim 1, wherein the measurement unit measures at least one of the position of the listener located in the space, the number and the arrangement of the speakers, or the space shape using a depth sensor that detects an object located in the space.

4. The acoustic processing device according to claim 1, wherein the measurement unit measures the position of the listener or the speakers located in the space by performing image recognition of the listener or the speakers using an image sensor comprised in the acoustic processing device or an external device.

5. The acoustic processing device according to claim 1, wherein the measurement unit measures the position of the listener located in the space by using a radio wave transmitted or received by a terminal device carried by the listener.

6. The acoustic processing device according to claim 1, wherein the measurement unit measures, as the space shape of the space, a distance to a ceiling of the space on a basis of reflected sound of sound emitted from an audio emission unit comprised in a speaker located in the space.

7. The acoustic processing device according to claim 1, wherein the measurement unit continuously measures the position of the listener located in the space, the number and the arrangement of the speakers, and the space shape, and the correction unit corrects the audio of the content emitted from the speaker located in the space by using information continuously measured by the measurement unit.

8. The acoustic processing device according to claim 1, wherein the acquisition unit acquires the recommended environment defined for the content from metadata included in the content.

9. The acoustic processing device according to claim 1, wherein the acquisition unit acquires a head-related transfer function of the listener, and the correction unit corrects audio of the speaker disposed in a vicinity of the listener on a basis of the head-related transfer function of the listener.

10. The acoustic processing device according to claim 1, wherein the measurement unit generates map information on a basis of an image captured by an image sensor comprised in the acoustic processing device or an external device and measures at least one of a position of the acoustic processing device itself, the position of the listener, the number and the arrangement of the speakers, or the space shape on a basis of the map information that has been generated.

11. The acoustic processing device according to claim 1, wherein the correction unit provides information measured by the measurement unit to a terminal device used by the listener and corrects the audio of the content on a basis of at least one of the position of the listener located in the space, the number and the arrangement of the speakers, or the space shape corrected on the terminal device by the listener.

12. The acoustic processing device according to claim 1, wherein the correction unit further corrects the audio of the content, the audio having been corrected by the correction unit, on a basis of correction performed by the listener.

13. The acoustic processing device according to claim 1, wherein the correction unit corrects the audio of the content on a basis of a behavior pattern of the listener or an arrangement pattern of the speakers learned on a basis of information measured by the measurement unit.

14. The acoustic processing device according to claim 1, wherein the acquisition unit includes at least one of a user input and a data input.

15. The acoustic processing device according to claim 1, wherein the measurement unit includes at least one sensor.

16. The acoustic processing device according to claim 15, wherein the at least one sensor includes at least one of a time of flight sensor, an image sensor, a microphone, or a plurality of antennas.

17. The acoustic processing device according to claim 1, wherein the acquisition unit software module, the measurement unit software module, and the correction unit software module are implemented by a computer.

18. An acoustic processing method, comprising:

by a computer, acquiring a recommended environment defined for each content, the recommended environment including an ideal arrangement of speakers in a space in which the content is reproduced;

measuring a position of a listener located in the space, a number and arrangement of the speakers, and a space shape; and correcting audio that is observed at the position of the listener, the audio included in the content emitted from a speaker located in the space, to audio to be emitted from a virtual speaker ideally disposed in the recommended environment on a basis of information that has been measured.

19. A computer implemented method for acoustic processing, comprising:

providing a program for causing a computer to function as:

an acquisition unit that acquires a recommended environment defined for each content, the recommended environment including an ideal arrangement of speakers in a space in which the content is reproduced, wherein the acquisition unit includes an acquisition unit software module;

a measurement unit that measures a position of a listener located in the space, a number and arrangement of the speakers, and a space shape, wherein the measurement unit includes a measurement unit software module; and a correction unit that corrects audio that is observed at the position of the listener, the audio included in the content emitted from a speaker located in the space, to audio to be emitted from a virtual speaker ideally disposed in the recommended environment on a basis of information measured by the measurement unit, wherein the correction unit includes a correction unit software module.

20. An acoustic processing system comprising an acoustic processing device and a speaker, wherein the acoustic processing device comprises:

an acquisition unit that acquires a recommended environment defined for each content, the recommended environment including an ideal arrangement of speakers in a space in which the content is reproduced, wherein the acquisition unit includes an input;

a measurement unit that measures a position of a listener located in the space, a number and arrangement of the speakers, and a space shape, wherein the measurement unit includes a sensor; and a correction unit that corrects audio that is observed at the position of the listener, the audio included in the content emitted from a speaker located in the space, to audio to be emitted from a virtual speaker ideally disposed in the recommended environment on a basis of information measured by the measurement unit, wherein the correction unit includes a correction unit software module, the speaker comprises:

an audio emission unit that emits an audio signal toward a predetermined portion of the space; and an observation unit that observes reflected sound of the audio signal emitted by the audio emission unit, and the measurement unit measures the space shape on a basis of a time having elapsed from emission of the audio signal by the audio emission unit to observation of the reflected sound by the observation unit.

* * * * *